United States Patent
Chua et al.

(10) Patent No.: US 11,953,329 B2
(45) Date of Patent: Apr. 9, 2024

(54) PLANNING SYSTEM FOR MULTIMODAL TRAVEL

(71) Applicant: Aurora Flight Sciences Corporation, Manassas, VA (US)

(72) Inventors: Zarrin Chua, Boston, MA (US); Martin Kearney-Fischer, Boston, MA (US); Francisco A. Navarro Félix, Lucerne (CH)

(73) Assignee: Aurora Flight Sciences Corporation, Manassas, VA (US)

( * ) Notice: Subject to any disclaimer, the term of this patent is extended or adjusted under 35 U.S.C. 154(b) by 245 days.

(21) Appl. No.: 17/643,863

(22) Filed: Dec. 13, 2021

(65) Prior Publication Data
US 2022/0290998 A1    Sep. 15, 2022

Related U.S. Application Data

(60) Provisional application No. 63/160,185, filed on Mar. 12, 2021.

(51) Int. Cl.
| | |
|---|---|
| *G01C 21/34* | (2006.01) |
| *G01C 21/36* | (2006.01) |
| *B64F 1/36* | (2017.01) |

(52) U.S. Cl.
CPC ..... *G01C 21/3423* (2013.01); *G01C 21/3446* (2013.01); *G01C 21/3484* (2013.01); *G01C 21/3617* (2013.01); *B64F 1/366* (2013.01)

(58) Field of Classification Search
None
See application file for complete search history.

(56) References Cited

U.S. PATENT DOCUMENTS

| | | | |
|---|---|---|---|
| 10,913,528 B1* | 2/2021 | Moore | B64C 29/0033 |
| 11,006,078 B1* | 5/2021 | Patel | G06T 7/62 |
| 11,859,988 B2* | 1/2024 | Rakah | G08G 1/005 |
| 2019/0377365 A1* | 12/2019 | Terahata | G01C 21/3469 |
| 2020/0003571 A1* | 1/2020 | Shirakawa | G08G 1/09 |
| 2020/0182637 A1* | 6/2020 | Kumar | G06Q 50/14 |
| 2020/0300644 A1* | 9/2020 | Tian | G01C 21/3438 |

OTHER PUBLICATIONS

Bielli et al., "Trends in Models and Algorithms for Fleet Management," Procedia Social and Behavioral Sciences, 2011, vol. 20, pp. 4-18.

* cited by examiner

*Primary Examiner* — Keith D Bloomquist
(74) *Attorney, Agent, or Firm* — Yee & Associates, P.C.

(57) ABSTRACT

A method, apparatus, system, and computer program product for planning multimodal travel. A planning request for the multimodal travel from a first location to an second location is received. Candidate routes are determined for a passenger that is customized for a set of customization parameters a using the first location, the second location, and a set of passenger preferences. A candidate route in the candidate routes comprises a first leg from the first location to a first vertiport via a first modality, a second leg for a passenger air vehicle to travel from the first vertiport to a second vertiport using an air modality, and a third leg from the second vertiport to the second location using a second modality. The candidate route in the candidate routes is selected to form a route for the multimodal travel for the passenger when a user input is received selecting the candidate route.

26 Claims, 11 Drawing Sheets

PLANNING SYSTEM FOR MULTIMODAL TRAVEL

RELATED PROVISIONAL APPLICATION

This application is related to and claims the benefit of priority of provisional U.S. Patent Application Ser. No. 63/160,185, entitled "PLANNING SYSTEM FOR MULTIMODAL TRAVEL", filed on Mar. 12, 2021, which is hereby incorporated by reference.

BACKGROUND INFORMATION

1. Field

The present disclosure relates generally to aircraft and, in particular, to a method, apparatus, system, and computer program product for planning multimodal travel involving aircraft.

2. Background

With increasing congestion of roadways in urban areas, other avenues of transportation such as mass transit have become more widely used. Ridesharing has also become increasingly popular. Ridesharing allows a user to request a vehicle to take the user to a destination. This type of on-demand transportation reduces frustrations with driving in traffic but is still subject to commute times that are affected by the amount of road traffic congestion.

Another type of transportation involves aircraft such as passenger air vehicles (PAVs). A passenger air vehicle (PAV) is a type of aircraft that can be used to provide on-demand transportation in urban areas. A passenger air vehicle can seat and provide a comfortable and reliable ride for the passenger.

A passenger air vehicle can be a piloted passenger air vehicle or can be an autonomous passenger air vehicle that provides for fully autonomous flight from takeoff to landing without needing a pilot. A personal air vehicle can take the form of an electrical vertical takeoff and landing (eVTOL) aircraft for use in transporting passengers. An electric power system can provide cleaner and quieter transportation. Passenger air vehicles can be used for urban commutes that may be, for example, 50 miles or more.

The flight of a passenger air vehicle from an origination location to a destination location is also referred to as a mission. A vertiport is located near both the origination location and the destination location. A vertiport is a location at which the passenger air vehicle can take off and land, including for vertical takeoff and landing vehicles.

A passenger air vehicle can be used to provide on-demand transportation services. For example, a personal air vehicle can be used in a ridesharing or air taxi service. For example, a passenger may use an app on a mobile phone to book travel from one vertiport to another vertiport using an on-demand transportation service. Planning transportation on a passenger air vehicle can be challenging with respect to scheduling the operation, and selecting starting and ending locations for travel.

SUMMARY

An embodiment of the present disclosure provides a method for planning multimodal travel. A planning request for the multimodal travel from a first location to an second location is received. A set of candidate routes is determined for a passenger that is customized for a set of customization parameters using the first location, the second location, and a set of passenger preferences. A candidate route in the set of candidate routes comprises a first leg from the first location to a first vertiport via a first modality, a second leg for a passenger air vehicle to travel from the first vertiport to a second vertiport using an air modality, and a third leg from the second vertiport to the second location using a second modality. The candidate route in the set of candidate routes is selected to form a route for the multimodal travel for the passenger when a user input is received selecting the candidate route.

Another embodiment of the present disclosure provides a method for planning multimodal transport. A planning request in a user input from a human machine interface is received from a user for the multimodal transport from a first location to a second location. A set of candidate routes that is customized for a set of customization parameters is determined using the first location, the second location, and a set of user preferences. A candidate route in the set of candidate routes comprises a first leg from the first location to a first vertiport via a first modality, a second leg for a passenger air vehicle to travel from the first vertiport to a second vertiport using an air modality, and a third leg from the second vertiport to the second location using a second modality. The user input selecting the candidate route to form a route for the multimodal transport is received.

Yet another embodiment of the present disclosure provides a multimodal planning system. The multimodal planning system comprises a computer system and a transportation manager in the computer system. The transportation manager is configured to receive a planning request for multimodal travel from a first location to a second location. The transportation manager is configured to determine a set of candidate routes for a passenger that is customized for a set of customization parameters using the first location, the second location, and a set of passenger preferences. A candidate route in the set of candidate routes comprises a first leg from the first location to a first vertiport via a first modality, a second leg for a passenger air vehicle to travel from the first vertiport to a second vertiport using an air modality, and a third leg from the second vertiport to the second location using a second modality. The transportation manager is configured to select the candidate route in the set of candidate routes to form a route for the multimodal travel for the passenger when a user input is received selecting the candidate route.

Still another embodiment of the present disclosure provides a multimodal planning system comprising a computer system and a transportation manager in the computer system. The transportation manager is configured to receive a planning request from a user for multimodal transport from a first location to a second location. The transportation manager is configured to determine a set of candidate routes that is customized for a set of customization parameters using the first location, the second location, and a set of user preferences. A candidate route in the set of candidate routes comprises a first leg from the first location to a first vertiport via a first modality, a second leg for an aircraft to travel from the first vertiport to a second vertiport using an air modality, and a third leg from the second vertiport to the second location using a second modality. The transportation manager is configured to receive a user input selecting the candidate route to form a route for the multimodal transport.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
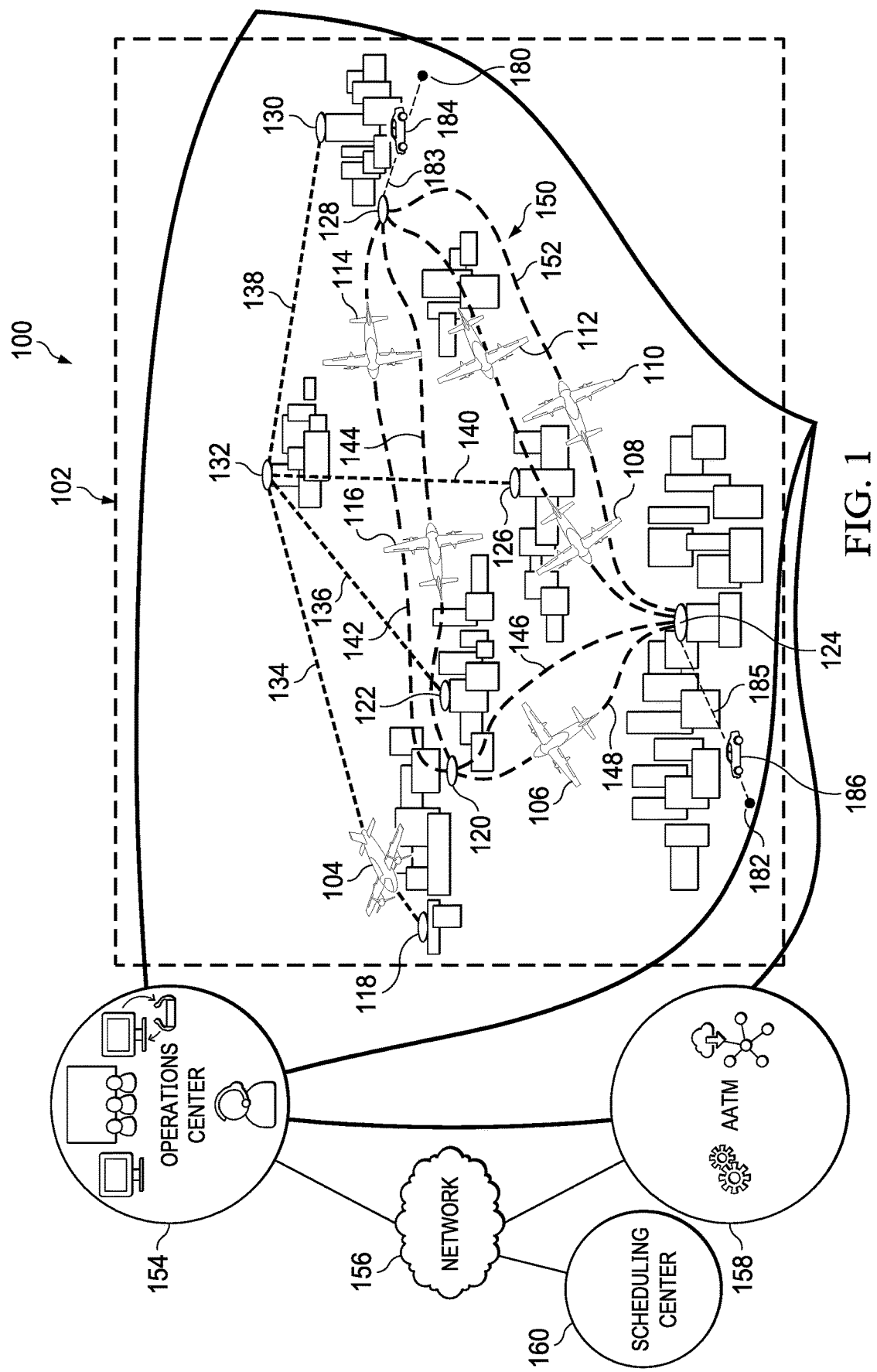
FIG. 1 is a pictorial illustration of an air vehicle management environment in accordance with an illustrative embodiment.

The illustrative embodiments recognize and take into account one or more different considerations. For example, the illustrative embodiments recognize and take into account that a passenger may find difficulty in planning travel from a first location, such as a start location, to a second location, such as an end location, that includes ground transportation in addition to air travel on a passenger air vehicle. The illustrative embodiments recognize and take into account that difficulties may occur because of variables in multimodal travel from the start location to a departure vertiport and then traveling from a destination vertiport to the end location.

The illustrative embodiments recognize and take into account that coordinating ground transportation to a vertiport and boarding the passenger air vehicle can be more difficult than desired. The illustrative embodiments recognize and take into account that many factors can be present in coordinating the multimodal travel from the start location to the end location.

For example, the illustrative embodiments recognize and take into account that traveling from the start location to the departure vertiport involves scheduling ground transportation such that the passenger arrives with sufficient time to board the passenger air vehicle at the departure vertiport. In planning the ground transportation, the illustrative embodiments recognize and take into account that the travel time needed to travel from the start location to the departure vertiport in time to board the passenger air vehicle may vary depending on the particular mode of travel used to reach the departure vertiport. For example, the illustrative embodiments recognize and take into account that a ridesharing vehicle, a taxi, a scooter, a bicycle, or some other mode of transportation can have different travel times. Further, the illustrative embodiments recognize and take into account that the travel time from the start location to the departure vertiport may vary depending on time of day, a number of demands, and traffic.

Additionally, the illustrative embodiments recognize and take into account that the amount of time needed to clear security with luggage and reach a gate for the passenger air vehicle can vary depending on the time of day. Further, the illustrative embodiments recognize and take into account that the passenger may overestimate the amount of time needed to reach the gate, which can result in waiting for long periods of time in a vertiport.

Therefore, it would be desirable to have a method and apparatus that take into account at least some of the issues discussed above, as well as other possible issues. For example, it would be desirable to have a method and apparatus that overcome a technical problem with planning travel using a passenger air vehicle. Thus, the illustrative embodiments provide a method, apparatus, system, and computer program product for planning travel on passenger air vehicles, including ground transportation.

With reference now to the figures and, in particular, with reference to FIG. 1, a pictorial illustration of an air vehicle management environment is depicted in accordance with an illustrative embodiment. As depicted, air vehicle management environment 100 is an environment in which air vehicles in the form of passenger aerial vehicles (PAVs) can be managed to move at least one of passengers, goods, cargo, or other objects from an origination location to destination locations in urban area 102. In this illustrative example, urban area 102 can include at least one of a city, a town, a suburb, a metropolitan area, or some other area that includes or encompasses one or more populated areas.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, passenger air vehicles servicing urban area 102 comprise passenger air vehicle 104, passenger air vehicle 106, passenger air vehicle 108, passenger air vehicle 110, passenger air vehicle 112, passenger air vehicle 114, and passenger air vehicle 116. In this illustrative example, the passenger air vehicles can be, for example, electrical vertical takeoff and landing (eVTOL) aircraft or air taxis. These types of vehicles can provide on-demand transportation in a manner that minimizes commutes for passengers that may be caused by road congestion and urbanization of populated areas. These passenger air vehicles can operate to provide on-demand aviation services to move the passengers from one location to another location.

In this illustrative example, the passenger air vehicles can fly along routes between different vertiports. In this illustrative example, vertiports are locations with structures for aircraft to land and take off vertically. As depicted, the vertiports include vertiport 118, vertiport 120, vertiport 122, vertiport 124, vertiport 126, vertiport 128, vertiport 130, and vertiport 132.

The vertiports in this example can be located in many different locations such as a ground location, on top of a building, or in some other suitable location that is desirable for commuting or transportation of objects. For example, vertiport 118, vertiport 122, vertiport 126, vertiport 130, and vertiport 132 are located on buildings while vertiport 120, vertiport 124, and vertiport 128 are located at ground locations.

As depicted, the passenger air vehicles can fly on different routes to move passengers, cargo, or both between vertiports within urban area 102. In this illustrative example, these routes include route 134, route 136, route 138, and route 140, which are routes between vertiports. The routes also include routes between ground locations. These routes include route 142, route 144, route 146, route 148, route 150, and route 152.

As depicted, the operation of the passenger air vehicles can be controlled by operations center 154. In this illustrative example, operations center 154 includes computers, communications equipment, navigation equipment, air traffic surveillance equipment, networks, and other suitable hardware that operate to manage missions for the passenger air vehicles in urban area 102. Operations center 154 can be in a single location or can be distributed through multiple locations in which the different computers at those locations are connected to each other by network 156.

In this illustrative example, operations center 154 can perform various operations selected from at least one of mission planning and optimization, mission validation, route authorization, mission monitoring, or other suitable functions. For example, operations center 154 can receive requests for use of passenger air vehicles from users. In processing these requests, operations center 154 can plan missions to transport the users between vertiports. In this illustrative example, the vertiports are in communication with operations center 154. These vertiports can be in direct communication with operations center 154 or can communicate with operations center 154 through automated aircraft traffic management 158.

In this depicted example, network 156 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. In other illustrative examples, network 156 can be implemented using a number of different types of networks. For example, network 156 can be comprised of at least one of the Internet, an intranet, a local area network (LAN), a metropolitan area network (MAN), or a wide area network (WAN).

As used herein, a "number of," when used with reference to items, means one or more items. For example, a "number of different types of networks" is one or more different types of networks.

As part of mission planning, operations center 154 can request authorization to fly missions along various routes. These requests can be sent to automated aircraft traffic management (AATM) 158 via network 156. In this illustrative example, automated aircraft traffic management (AATM) 158 is a traffic management system for uncontrolled operations of passenger air vehicles that are separate from and complementary to the legacy air traffic management (ATM) system for the Federal aviation Authority (FAA).

Further, operations center 154 can also communicate with at least one of the passenger air vehicles or the vertiports. These components are also connected to network 156. For example, the passenger air vehicles can be connected to network 156 using wireless connections. In this manner, the passenger air vehicles can communicate with each other, the vertiports, operations center 154, or some combination thereof. As another example, the passenger air vehicles can communicate with each other directly using vehicle-to-vehicle (V2V) communications while using frequency ranges such as 5.855 GHs to 5.905 GHz and 5.770 GHz to 5.850 GHz or other frequency ranges that may be made available.

In this illustrative example, requests for transportation services by the passenger air vehicles can be received from various sources including scheduling center 160. As depicted, scheduling center 160 can perform planning operations to schedule passenger air vehicle travel between the vertiports in air vehicle management environment 100. In this illustrative example, the requests for travel on the passenger air vehicles can be sent to operations center 154 over network 156.

Additionally, scheduling center 160 can also plan the travel from start locations to end locations that include ground transportation. In other words, the start and end locations may not be vertiports. The start and end locations can be, for example, an address or a location for a house, a GPS coordinate, a building, a street corner, a taxi stand, or some other location.

As a result, scheduling center 160 enables users to plan point-to-point trips using the passenger air vehicles in combination with ground transportation vehicles. In this illustrative example, scheduling center 160 can plan multimodal travel having three legs. The first leg is from a start location to a departure vertiport, a second leg is from the departure vertiport and a destination vertiport, and a third leg is from the destination vertiport to the end location. In other illustrative examples, more complex planning can be performed involving multiple air travel segments, three or more ground transportation segments, or some combination thereof.

For example, travel can be planned from start location 180 to end location 182. This travel can include a first leg on route 183 from start location 180 to a departure vertiport, vertiport 128, via a ground mode of transportation in the form of ridesharing vehicle 184. The second leg is from the departure vertiport, vertiport 128, to a destination vertiport, vertiport 124, via passenger air vehicle 110 on route 152. The third mode of travel is on route 185 from the departure vertiport, vertiport 124, to end location 182 via a ground mode of transportation in the form of ridesharing vehicle 186.

The illustration of air vehicle management environment 100 in FIG. 1 is provided as an example of one implementation for this type of environment and is not meant to limit the manner in which air vehicle management environment 100 can be implemented in other illustrative examples. For example, in other illustrative examples, routes may be present between ground locations and buildings. In yet another illustrative example, one or more routes can connect urban area 102 to one or more urban areas in air vehicle management environment 100.

In another illustrative example, the passenger air vehicles may include air vehicles with combustion propulsion systems in addition to or in place of using electric propulsion systems. In yet another example, operations center 154 can also manage missions for other urban areas in addition to or in place of urban area 102. In other illustrative examples, any type of air traffic management system can be used in addition to or in place of automated aircraft traffic management (AATM) 158.

In still another illustrative example, one or more scheduling centers can be present in addition to or in place of scheduling center 160 that generate requests to operations center 154. In yet other illustrative examples, scheduling center 160 can be used to plan transportation for objects other than passengers. For example, scheduling center 160 can be located in a shipping center that is used to plan transportation for packages.

As depicted, network 156 enables distributing scheduling processes. For example, the scheduling processes performed by scheduling center 160 can be distributed into different physical locations in air vehicle management environment 100. Further, different scheduling processes can be located in at least one of scheduling center 160, operations center 154, or other locations within air vehicle management environment 100. In other words, scheduling is not limited to the form within a single physical location, such as scheduling center 160.

As another illustrative example, air vehicle management environment 100 can be applied to managing air vehicles other than passenger air vehicles and can be applied to other landing and takeoff facilities in addition to or in place of vertiports. For example, air vehicle management environment 100 can also include hubs, airports, helipads, or other types of facilities from which air vehicles can operate and be managed by scheduling center 160.

Figure 2:
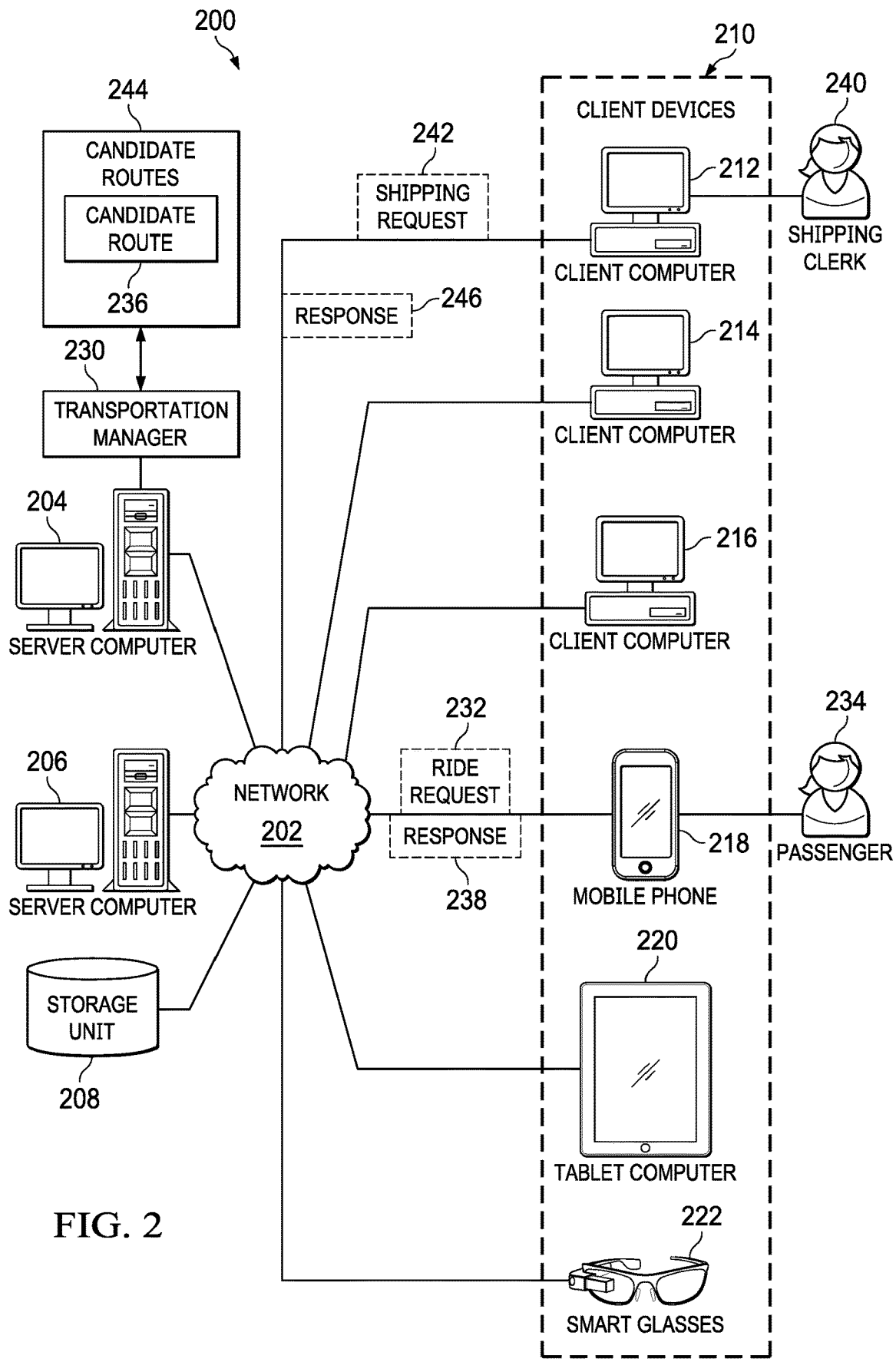
FIG. 2 is a pictorial representation of a network of data processing systems in which illustrative embodiments may be implemented.

With reference now to FIG. 2, a pictorial representation of a network of data processing systems is depicted in which illustrative embodiments may be implemented. Network data processing system 200 is a network of computers in which the illustrative embodiments may be implemented. For example, network data processing system 200 can be used to implement data processing components in air vehicle management environment 100 in FIG. 1. For example, the data processing components in at least one of operations center 154, automated aircraft traffic management (AATM) 158, scheduling center 160, passenger air vehicles, and vertiports can have hardware from network data processing system 200.

Network data processing system 200 contains network 202, which is the medium used to provide communications links between various devices and computers connected together within network data processing system 200. Network 202 may include connections, such as wire, wireless communication links, or fiber optic cables.

In the depicted example, server computer 204 and server computer 206 connect to network 202 along with storage unit 208. In addition, client devices 210 connect to network 202. As depicted, client devices 210 include client computer 212, client computer 214, and client computer 216. Client devices 210 can be, for example, computers, workstations, or network computers. In the depicted example, server computer 204 provides information, such as boot files, operating system images, and applications to client devices 210. Further, client devices 210 can also include other types of client devices such as mobile phone 218, tablet computer 220, and smart glasses 222. In this illustrative example, server computer 204, server computer 206, storage unit 208, and client devices 210 are network devices that connect to network 202 in which network 202 is the communications media for these network devices. Some or all of client devices 210 may form an Internet of things (IoT) in which these physical devices can connect to network 202 and exchange information with each other over network 202.

Client devices 210 are clients to server computer 204 in this example. Network data processing system 200 may include additional server computers, client computers, and other devices not shown. Client devices 210 connect to network 202 utilizing at least one of wired, optical fiber, or wireless connections.

Program code located in network data processing system 200 can be stored on a computer-recordable storage media and downloaded to a data processing system or other device for use. For example, program code can be stored on a computer-recordable storage media on server computer 204 and downloaded to client devices 210 over network 202 for use on client devices 210.

In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 200 also may be implemented using a number of different types of networks. For example, network 202 can be comprised of at least one of the Internet, an intranet, a local area network (LAN), a metropolitan area network (MAN), or a wide area network (WAN). FIG. 2 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, transportation manager 230 in server computer 204 are examples of components that can be used to perform planning for multimodal travel. In one illustrative example, transportation manager 230 can perform planning operations for multimodal transportation. This multimodal transportation can be, for example, multimodal travel for passengers or multimodal transportation for cargo.

In one illustrative example, transportation manager 230 can receive a scheduling request for transportation in the form of ride request 232 from mobile phone 218 operated by passenger 234. In this illustrative example, ride request 232 includes a start location, an end location, a set of dates, a number of passengers, an amount of luggage, a weight and/or size of a package, and other information. In this example, preferences for passenger 234 can be received in ride request 232 or can be saved in a database. For example, the preferences can include vertiport amenities, a type of ground transport, passenger air vehicle size, or other suitable preferences.

As used herein, a "set of," when used with reference to items, means one or more items. For example, a "set of dates" is one or more dates.

In this illustrative example, transportation manager 230 can determine candidate routes 244 based on information in ride request 232. These candidate routes can also be based on preferences for passenger 234. Each of candidate routes 244 includes three legs in this depicted example. For example, a first leg is from a start location to a departure vertiport via a first modality, a second leg is for a passenger air vehicle to travel from the departure vertiport to a destination vertiport using an air modality, and a third leg is from the destination vertiport to an end location using a second modality. Different candidate routes in candidate routes 244 can have different departure and destination vertiports depending on the preferences for passenger 234.

In identifying candidate routes 244, transportation manager 230 can also assign resources or place resources on hold for candidate routes 244. For example, transportation manager 230 can assign a landing slot or a landing pad at the different departure and destination vertiports in candidate routes 244. As another example, transportation manager 230 can generate tentative reservations or assignments for the ground transportation in candidate routes 244.

Transportation manager 230 can send candidate routes 244 to mobile phone 218 for display to passenger 234. Passenger 234 can return user input in the form of response 238 that identifies candidate route 236 from candidate routes 244 that is to be used for travel by passenger 234. In response to receiving the selection in response 238, transportation manager 230 can plan travel for passenger 234 using the selected candidate route. In this illustrative example, any assignments or holds on resources for candidate routes 244 not selected can be released.

In addition to or in place of planning travel for passengers, transportation manager 230 can also plan transportation for cargo. Cargo are goods that can be transported in containers. The cargo can be, for example, electronics, furniture, food, or other types of physical items.

For example, a user, such as shipping clerk 240, can generate a transportation request in the form of shipping request 242 to ship a package from a start location to an end location. The start location can be a warehouse with the end location being an office in an office building. Shipping request 242 can also include a ship date, an arrival or shipping time, and other suitable parameters.

In response to receiving shipping request 242, transportation manager 230 can generate candidate routes 244. Each of candidate routes 244 can also have three legs; a first leg is from a start location to a departure location via a first modality, a second leg is for an aircraft to travel from the departure location to an arrival location using an air modality, and a third leg is from the arrival location to an end location using a second modality. In this illustrative example, the departure and arrival location can be an aircraft facility selected from at least one of a vertiport, an airport, or some other suitable aircraft facility from which aircraft can take off or land.

In this illustrative example, transportation manager 230 sends candidate routes 244 that can be sent to client computer 212 for display to shipping clerk 240. Shipping clerk 240 can select one of candidate routes 244 for use in shipping a package. The selected route is indicated in response 246 sent from client computer 212 to transportation manager 230. Transportation manager 230 can plan transporting the package using the selected candidate route identified in response 246.

As a result, transportation manager 230 can operate to provide transportation of at least one of a passenger or cargo using multimodal transport. In the illustrative examples, at least one leg of the multimodal transport includes use of an aircraft such as a passenger air vehicle, a cargo aircraft, a commercial aircraft, or other suitable aircraft that can carry cargo.

Figure 3:
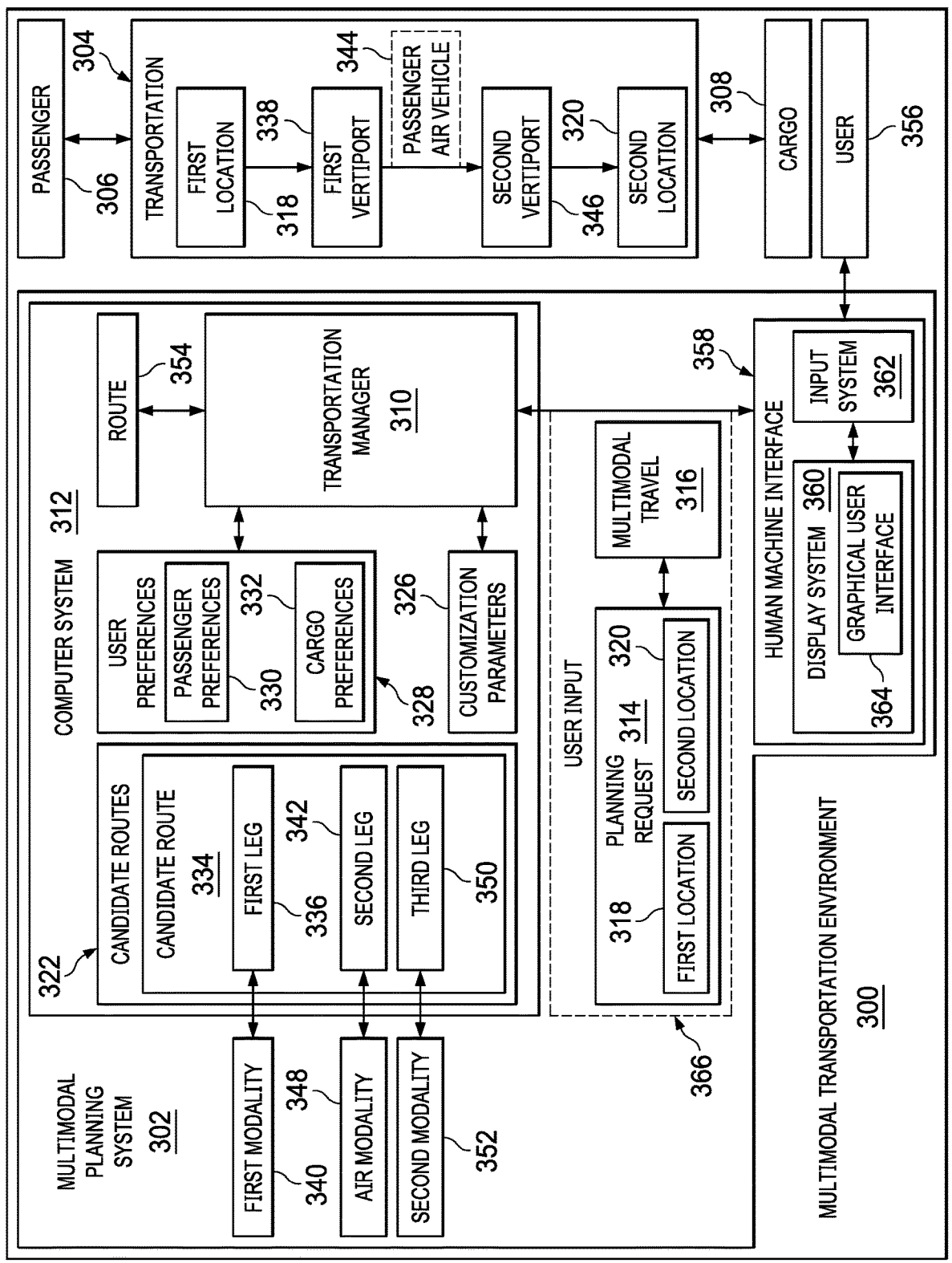
FIG. 3 is an illustration of a block diagram of a multimodal transportation environment in accordance with an illustrative embodiment.

With reference now to FIG. 3, an illustration of a block diagram of a multimodal transportation environment is depicted in accordance with an illustrative embodiment. In this illustrative example, multimodal transportation environment 300 can be implemented using physical components depicted in air vehicle management environment 100 in FIG. 1 and network data processing system 200 in FIG. 2.

In this illustrative example, multimodal planning system 302 in multimodal transportation environment 300 can operate to plan transportation 304 for at least one of passenger 306 or cargo 308. In this illustrative example, multimodal planning system 302 comprises transportation manager 310 and computer system 312. As depicted, transportation manager 310 is located in computer system 312.

Transportation manager 310 can be implemented in software, hardware, firmware, or a combination thereof. When software is used, the operations performed by transportation manager 310 can be implemented in program code configured to run on hardware, such as a processor unit. When firmware is used, the operations performed by transportation manager 310 can be implemented in program code and data and stored in persistent memory to run on a processor unit. When hardware is employed, the hardware can include circuits that operate to perform the operations in transportation manager 310.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 312 is a physical hardware system and includes one or more data processing systems. When more than one data processing system is present in computer system 312, those data processing systems are in communication with each other using a communications medium. The communications medium can be a network. The data processing systems can be selected from at least one of a computer, a server computer, a tablet computer, or some other suitable data processing system.

In this illustrative example, transportation manager 310 is configured to perform a number of different operations. For example, transportation manager 310 can receive planning request 314 for multimodal travel 316 from first location 318 to second location 320. First location 318 can be a start location and second location 320 can be an end location. In some illustrative examples, first location 318 and second location 320 can be intermediate locations between a start location and an end location. In this illustrative example, at least one of passenger 306 or cargo 308 can travel from first location 318 to second location 320 using multimodal travel 316.

Transportation manager 310 can determine a set of candidate routes 322 that is customized using a set of customization parameters 326, first location 318, second location 320, and a set of user preferences 328. The set of customization parameters 326 can be parameters that that can be improved upon in selecting legs for candidate routes 322.

For example, the set of customization parameters 326 can include parameters for at least one of a flight time, a fuel usage, a vertiport operating cost, passenger revenues, or other suitable factors. These customization parameters are parameters that can be improved upon as part of determining a set of candidate routes 322. In this illustrative example, the set of customization parameters 326 can also take into account other factors such as vehicle state and capability. For example, the set of customization parameters 326 includes factors such as fuel tank size, dimensions of an air vehicle, required runway for takeoff and landing, or other factors that can be used for selecting candidate routes 322.

The set of customization parameters 326 can change depending on what parameters are of interest for improvement when determining the set of candidate routes 322. For example, if a goal is for reducing fuel usage and vertiport operating costs, these two parameters can be selected for the set of customization parameters 326 that are improved upon when selecting a set of candidate routes 322. In this example, the legs for a set of candidate routes 322 can be selected that result in reducing fuel usage and vertiport operating costs.

If the goal is for a particular price requested by a passenger and increasing passenger revenues, these two parameters can be the set of customization parameters 326 that are improved upon and used to select the set of candidate routes 322. For example, the legs for the set of candidate routes 322 can be selected that result in meeting or coming under a passenger price and improving passenger revenues.

In this example, the set of user preferences 328 can take the form of a set of passenger preferences 330 or a set of cargo preferences 332. In this illustrative example, transportation 304 can be for at least one of passenger 306 or cargo 308.

The set of passenger preferences 330 can be selected from at least one of a departure time, an arrival time, a number of passengers, an amount of luggage, a vertiport amenity, a passenger price for travel, a first leg travel mode, a second leg travel mode, a vertiport size, a vertiport location, or other passenger preferences for travel. Transportation manager 310 can use the set of passenger preferences 330 in selecting the different legs for creating candidate routes 322.

In another illustrative example, user preferences 328 can be a set of cargo preferences 332 for the manner in which cargo 308 is transported. The set of cargo preferences 332 can be selected from at least one of a delivery time, a daytime delivery, a first overnight delivery, a second day delivery, a home delivery, a business delivery, a shipping cost, or other suitable preferences.

As depicted, candidate route 334 in the set of candidate routes 322 comprises first leg 336 from first location 318 to first vertiport 338 via first modality 340, second leg 342 for passenger air vehicle 344 to travel from first vertiport 338 to second vertiport 346 using air modality 348, and third leg 350 from second vertiport 346 to second location 320 using second modality 352. First vertiport 338 can be a departure vertiport and second vertiport 346 can be a destination vertiport. In this illustrative example, first modality 340 and second modality 352 are ground-based transportation vehicles. These modalities may be the same or different types of vehicles.

In this illustrative example, selection of candidate route 334 for use as route 354 in transportation 304 of passenger 306, cargo 308, or both can be performed in a number of different ways. In this illustrative example, transportation manager 310 can select candidate route 334 in the set of candidate routes 322 as route 354 for multimodal travel 316 for at least one of passenger 306 or cargo 308 when user input 366 is received selecting candidate route 334. Multimodal travel 316 involves two or more modes of travel. In this depicted example, multimodal travel 316 includes ground travel and air travel.

In another illustrative example, candidate route 334 can be selected by user 356 in the form of a human operator using human machine interface (HMI) 358.

As depicted, human machine interface 358 comprises display system 360 and input system 362. In this illustrative example, display system 360 is a physical hardware system and includes one or more display devices on which graphical user interface 364 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

In this illustrative example, information such as the set of candidate routes 322 can be displayed in graphical user interface 364 on display system 360. In this manner, the set of candidate routes 322 can be visualized by user 356.

User 356 is a person that can interact with graphical user interface 364 through user input 366 generated by input system 362. In this illustrative example, input system 362 is a physical hardware system and can be selected from at least one of a mouse, a keyboard, a trackball, a touchscreen, a stylus, a motion sensing input device, a gesture detection device, a cyber glove, or some other suitable type of input device.

As depicted, the set of candidate routes 322 can be displayed on display system 360 in human machine interface 358. Transportation manager 310 can receive user input 366 selecting candidate route 334 from the set of candidate routes 322 as route 354 for multimodal travel 316. This user input can be received from input system 362 in human machine interface 358.

Figure 4:
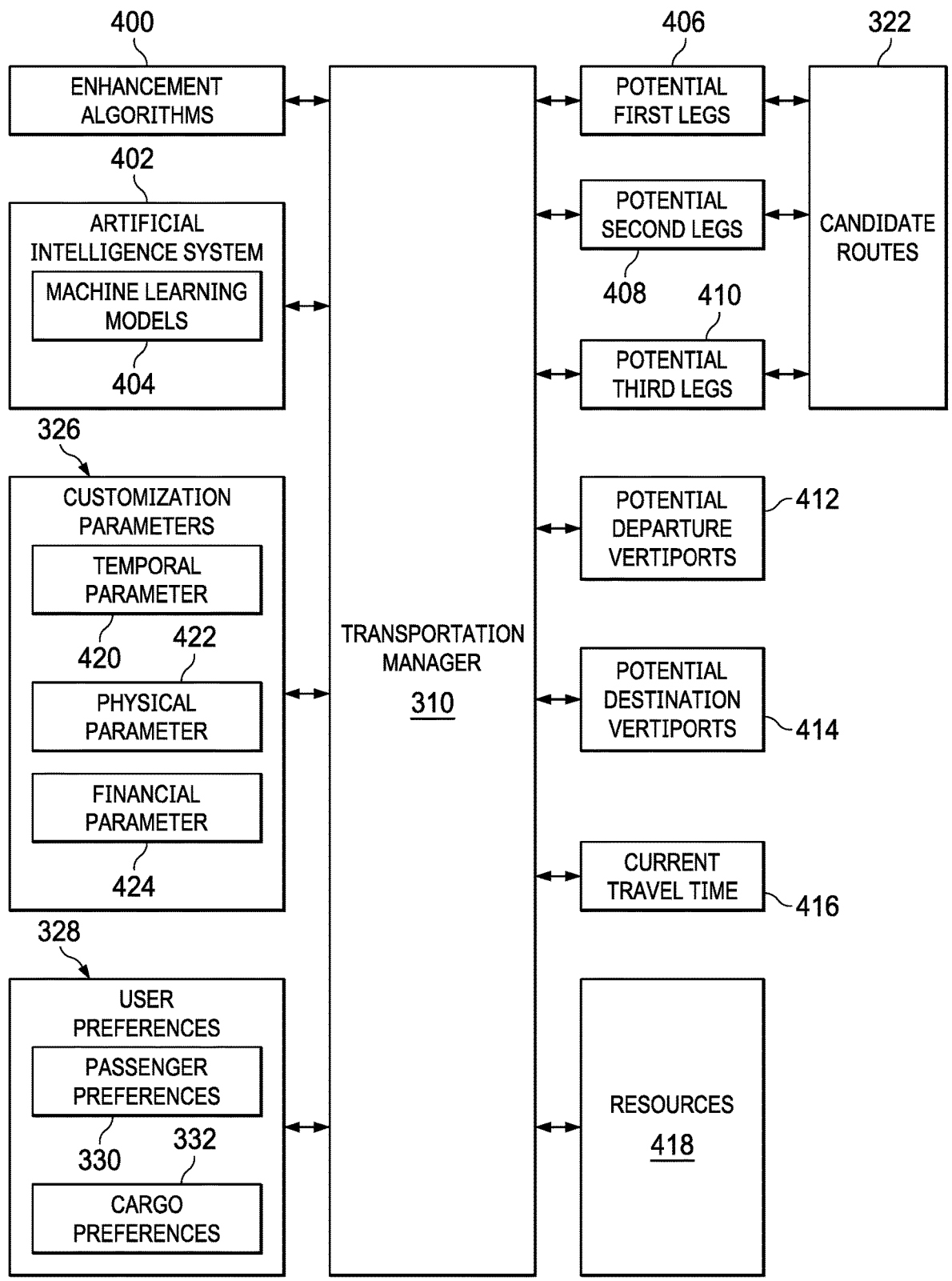
FIG. 4 is an illustration of a block diagram of components used to determine candidate routes in accordance with an illustrative embodiment.

With reference now to FIG. 4, an illustration of a block diagram of components used to determine candidate routes is depicted in accordance with an illustrative embodiment. In the illustrative examples, the same reference numeral may be used in more than one figure. This reuse of a reference numeral in different figures represents the same element in the different figures.

Transportation manager 310 can determine a set of candidate routes 322 in a number of different ways. For example, transportation manager 310 can use a set of enhancement algorithms 400. The set of enhancement algorithms 400 can be designed to solve a problem such as a vehicle routing problem (VRP).

The set of optimization enhancement 400 can be selected from at least one of a mathematical optimization, a Dijkstra's algorithm, an A* algorithm, a vehicle routing problem (VRP) algorithm, a capacitated vehicle routing problem (CVRP) algorithm, a pickup and delivery vehicle routing problem (PDVRP) algorithm, an open vehicle routing problem (OVRP) algorithm, a vehicle routing problem with time windows (VRPTW) algorithm, or some other suitable algorithm or process.

As depicted, the set of enhancement algorithms 400 can be implemented using artificial intelligence system 402 which can include a set of machine learning models 404. Artificial intelligence system 402 is a system that has intelligent behavior and can be based on the function of a human brain. Artificial intelligence system 402 comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of artificial intelligence system 402.

A machine learning model in machine learning models 404 is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, an anomaly detection, association rules, or other types of learning algorithms. Examples of machine learning models 404 that can be used in the set of machine learning models 404 include an artificial neural network, a decision tree, a support vector machine, a Bayesian network, a genetic algorithm, and other types of models. These machine learning models can be trained using data and process additional data to provide a desired output.

In this illustrative example, the set of candidate routes 322 can comprise a set of potential first legs 406, a set of potential second legs 408, and a set of potential third legs 410. In this illustrative example, the set of potential first legs 406 and the set of potential third legs 410 are based on ground transportation. The set of potential second legs 408 is based on air transportation using aircraft such as passenger air vehicle 344 in FIG. 3.

In this illustrative example, transportation manager 310 can determine the set of potential first legs 406 from first location 318 in FIG. 3 to potential first vertiports 412 using a set of customization parameters 326 and a set of user preferences 328, such as a set of passenger preferences 330 or a set of cargo preferences 332.

As depicted, transportation manager 310 can determine the set of potential second legs 408 from potential first vertiports 412 to a set of potential second vertiports 414 using the set of customization parameters 326 and the set of user preferences 328. Potential first vertiports 412 can be referred to as potential departure vertiports, and potential second vertiports 414 can be referred to as destination vertiports.

Transportation manager 310 can also determine the set of potential third legs 410 from the set of potential second vertiports 414 to second location 320 in FIG. 3 using the set of customization parameters 326 and the set of user preferences 328. The set of candidate routes 322 can be created from the set of potential first legs 406, the set of potential second legs 408, and the set of potential third legs 410.

In this illustrative example, the set of customization parameters 326 for which improvements can be made when planning transportation 304 can include at least one of temporal parameter 420, physical parameter 422, or financial parameter 424. Candidate routes 322 can be selected in a manner such that at least one of these different types of parameters are improved.

Temporal parameter 420 can be, for example, a duration of candidate route 334 in FIG. 3 or a duration of at least one of first leg 336, second leg 342, or third leg 350 in FIG. 3. Thus, the selection of potential legs may be made such that durations may be improved with respect to temporal compatibility between the legs for a candidate route. In this illustrative example, the temporal compatibility can be the compatibility between timing of the legs to form candidate routes 334. Improvements in the temporal compatibility can involve improving the compatibility between the timing of potential legs in candidate routes 334.

For example, a temporal compatibility can be present when a passenger arriving using a ridesharing vehicle for a potential first leg at a potential departure vertiport has sufficient time to reach passenger air vehicle 344 for a flight for a potential second leg. The temporal compatibility between the first potential leg and the second potential leg can take into account factors such as amount of time to pass through a security check-in at a particular time, moving luggage, travel within a potential departure vertiport, or other suitable factors. These different parameters can be identified using historical information for particular types of transport or vertiports over time.

In this illustrative example, a machine learning model in machine learning models 404 in artificial intelligence system 402 can be trained to improve the selection of legs for potential legs for candidate routes 322. The machine learning model can be trained with historical data to enable predicting factors that affect temporal compatibility between different potential legs. For example, the machine learning model may enable predicting that 7:00 AM to 9:00 AM is the busiest time at a particular vertiport. For example, the machine learning model can predict the amount of time needed to clear security stations, the amount of time to travel within a vertiport, as well as other factors that take time in determining compatibility between different potential legs for candidate routes 322.

In this example, physical parameter 422 can be an amount of volume in a vehicle that is available for storing luggage or cargo. In this illustrative example, this parameter can be improved by selecting vehicles that have sufficient space for storage of the luggage for a particular flight without selecting the vehicles that have much more space than needed. Physical parameter 422 can also be physical resources for the modes of transportation such as the availability of an arrival vertiport or a destination vertiport selected for a potential second leg. For example, potential legs can be selected to increase the likelihood that physical resources are available for use.

As another illustrative example, physical parameter 422 can take into account weather or other environmental conditions. For example, the potential legs can be selected to reduce the likelihood of delays or issues caused by the environmental conditions that may affect travel. The environment conditions can be improved by selecting a leg that avoids an undesired environmental condition, such as a thunderstorm, or a leg that has a desired environmental condition, such as clear weather. As another example, physical parameter 422 can also take into account conditions at a vertiport. For example, physical parameter 422 can take into account construction or maintenance that can affect the availability of slots or pads and, in particular, a vertiport. Physical parameter 422 can also take into account physical characteristics of potential vertiports.

In the illustrative example, financial parameter 424 can be a route cost, a fuel cost, a vertiport cost, a passenger revenue, or other financial considerations. These different parameters can be improved upon when determining the potential legs for the set of candidate routes 322.

These different types of customization parameters 326 can be improved through the selection of potential legs for the set of candidate routes 322 to meet desired goals. These improvements can be, for example, reducing costs, increasing passenger satisfaction, increasing passenger revenue, reducing possible operating costs, reducing fuel costs, reducing time duration of travel, reducing total distance of travel, or other goals.

In this illustrative example, the set of candidate routes 322 is displayed to user 356 in graphical user interface 364 in display system 360 in human machine interface 358 in FIG. 3. User 356 can then select candidate route 334 from the set of candidate routes 322 for use in transportation 304 of at least one of passenger 306 or cargo 308.

Further, in another illustrative example, transportation manager 310 can redetermine the set of potential third legs 410 from second vertiport 346 to second location 320 in FIG. 3 based on current travel time 416 to form an updated set of potential third legs 410 while passenger air vehicle 344 is enroute to second vertiport 346 on second leg 342 in FIG. 3. In this particular example, first leg 336 in FIG. 3 has already occurred and passenger air vehicle 344 is enroute on second leg 342. As depicted, third leg 350 in FIG. 3 may have already been selected when selecting candidate route 334. This depicted example enables redetermining a set of potential third legs 410 for use based on current travel time 416.

In this example, current travel time 416 can be the amount of time that has passed so far in second leg 342. Current travel time 416 can be ahead of or behind the estimated amount of travel time for the current position of passenger air vehicle 344 in FIG. 3.

Current travel time 416 can be used to determine an updated estimated time of arrival at second vertiport 346 in FIG. 3. This updated estimated time of arrival may be an earlier arrival time, a later arrival time, or an on-time arrival time for second leg 342. The redetermination of the set of potential third legs 410 can provide different potential third legs and provide a more accurate estimate for selecting the different potential third legs based on the updated estimated time of arrival.

With respect to resources 418 needed for the different legs, transportation manager 310 can assign resources 418 for the legs comprising the set of candidate routes 322 when the set of candidate routes 322 is created. These resources can include, for example, a vertiport, a passenger air vehicle, a ground transportation vehicle, or other resources that are used to transport at least one of passenger 306 or cargo 308 in FIG. 3. When candidate route 334 is selected from the set of candidate routes 322, transportation manager 310 can release resources 418 assigned to the legs in unselected candidate routes when candidate route 334 is selected as route 354 for multimodal travel 316 in FIG. 3.

In another illustrative example, transportation manager 310 can assign resources 418 for first leg 336 and second leg 342 when user input 366 selects candidate route 334 including first leg 336 and second leg 342. As yet another example, transportation manager 310 can assign resources 418 to third leg 350 when at least one of passenger air vehicle 344 arrives at second vertiport 346 for flight of passenger air vehicle 344 during second leg 342 of route 354.

In other words, transportation manager 310 can assign resources for none or one or more of potential legs that make up candidate routes 322 prior to a selection of candidate route 334. In this manner, candidate route 334 selected by user 356 can be guaranteed to be usable as route 354. In other illustrative examples, transportation 304 may not assign resources 418 until the selection of candidate route 334 is made. The time at which resources 418 are assigned can depend on the availability of resources 418.

Figure 5:
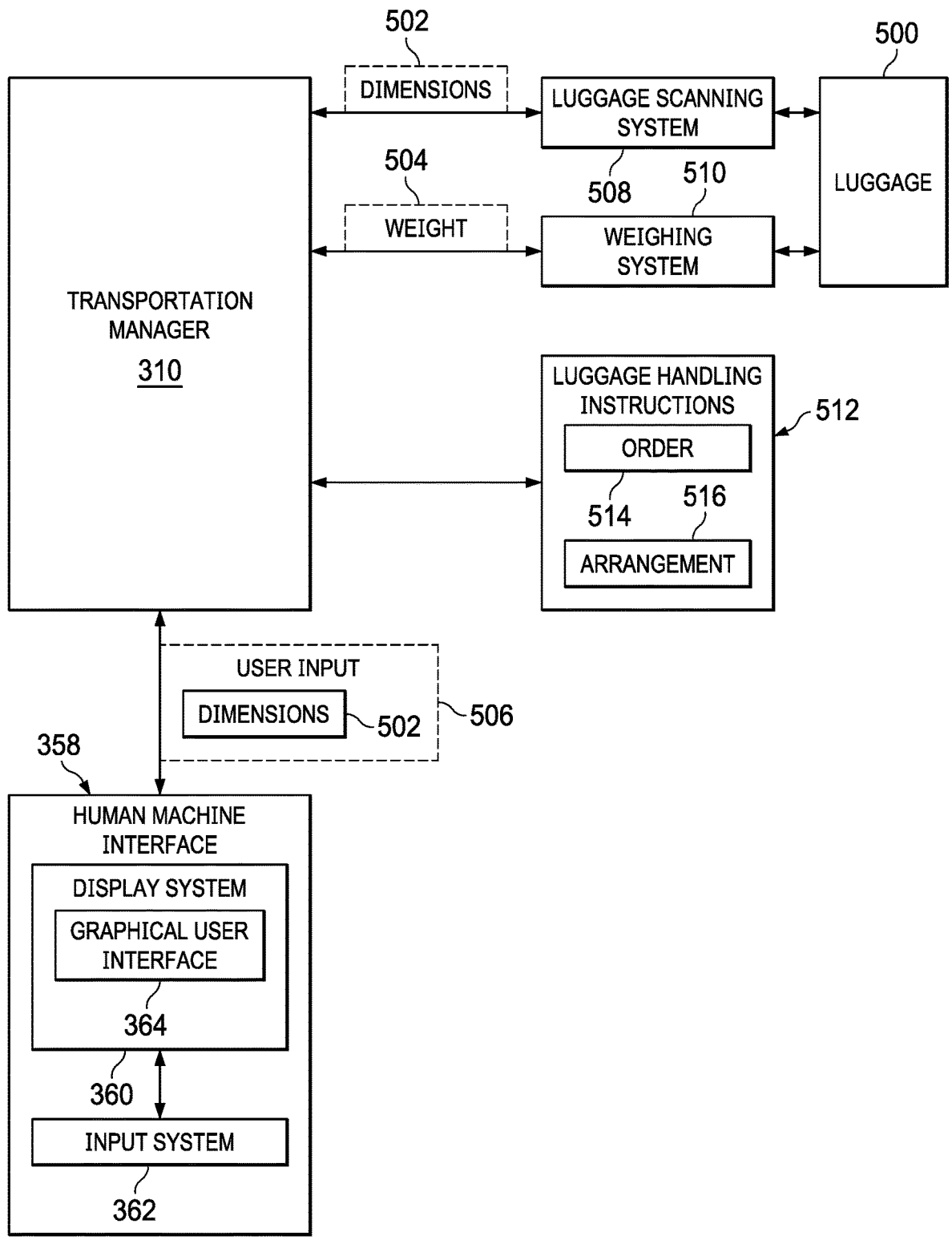
FIG. 5 is an illustration of a block diagram of components used to manage luggage for a passenger in accordance with an illustrative embodiment.

With reference next to FIG. 5, an illustration of a block diagram of components used to manage luggage for a passenger is depicted in accordance with an illustrative embodiment. In this illustrative example, transportation manager 310 can determine candidate routes 322 taking into account luggage 500 for passenger 306 in FIG. 3. For example, a particular ground vehicle may not be suitable for first leg 336 in FIG. 3 if the ground vehicle cannot accommodate carrying luggage 500. As another example, the selection of passenger air vehicle 344 for second leg 342 in FIG. 3 can also depend on the ability of passenger air vehicle 344 to carry luggage 500.

In one illustrative example, transportation manager 310 determines one or more dimensions in dimensions 502 of luggage 500. Further, transportation manager 310 can also determine weight 504 of luggage 500. Weight 504 can be an important consideration in addition to dimensions 502 with respect to air travel using passenger air vehicle 344.

In this illustrative example, dimensions 502 can be determined in a number of different ways. For example, dimensions 502 can be received in user input 506 from passenger 306 in FIG. 3 using human machine interface 358. In another illustrative example, dimensions 502 can be received from luggage scanning system 508. For example, luggage scanning system 508 can include a sensor system that can project structure light in the form of a grid to enable generating images for determining volumetric data for luggage 500. Luggage scanning system 508 can be a mobile phone, a device installed in the trunk of a vehicle, a device located in a lobby of a vertiport, or a device in some other suitable location.

Weight 504 can be received from weighing system 510. In this illustrative example, weighing system 510 can include, for example, a digital luggage scale. These devices can also be in various locations such as the trunk of a vehicle, a check-in counter at a vertiport, or in some other suitable location.

With dimensions 502 of luggage 500, transportation manager 310 can determine a set of candidate routes 322 in FIGS. 3-4 for passenger 306 that is customized for the set of customization parameters 326 using first location 318, second location 320, a set of passenger preferences 330, and at least one of dimensions 502 of luggage 500 or weight 504 of luggage 500. In the illustrative example, weight 504 can be used in determining the set of candidate routes 322.

Additionally, transportation manager 310 can create luggage handling instructions 512 using dimensions 502 of luggage 500. In this example, luggage handling instructions 512 can instruct passenger 306 on at least one of order 514 in which luggage 500 is to be loaded into a vehicle or arrangement 516 of luggage 500 in the vehicle. Additionally, luggage handling instructions 512 can also include instructions for removing luggage from the vehicle. Luggage handling instructions 512 can include instructions for each vehicle that passenger 306 will use to travel on route 354.

In this illustrative example, luggage handling instructions 512 can take a number of different forms. For example, luggage handling instructions 512 can be a diagram, audio instructions, an animation, a video, or some other suitable type of media. In this manner, efficient use of cargo room in a vehicle can be used to carry luggage 500.

In one illustrative example, one or more technical solutions are present that overcome a technical problem with planning travel using a passenger air vehicle. As a result, one or more technical solutions can provide a technical effect of improving planning multimodal travel for point-to-point transportation of passengers. In the illustrative example, one or more technical solutions are present in which candidate routes are created for the multimodal travel.

In one illustrative example, the multimodal travel includes a first leg from a start point to a departure vertiport using ground transportation, a second leg from the departure vertiport to a destination vertiport using air transportation, and a third leg from the destination vertiport to an end location using the ground transportation. The different candidate routes can be generated taking into account various factors including luggage that can be carried when the transportation is for one or more passengers.

Computer system 312 in FIG. 3 can be configured to perform at least one of the steps, operations, or actions described in the different illustrative examples using software, hardware, firmware, or a combination thereof. As a result, computer system 312 operates as a special purpose computer system in which transportation manager 310 in computer system 312 enables planning travel using multiple modes of travel to transport at least one of passengers or cargo. In particular, transportation manager 310 transforms computer system 312 into a special purpose computer system as compared to currently available general computer systems that do not have transportation manager 310.

Figure 6:
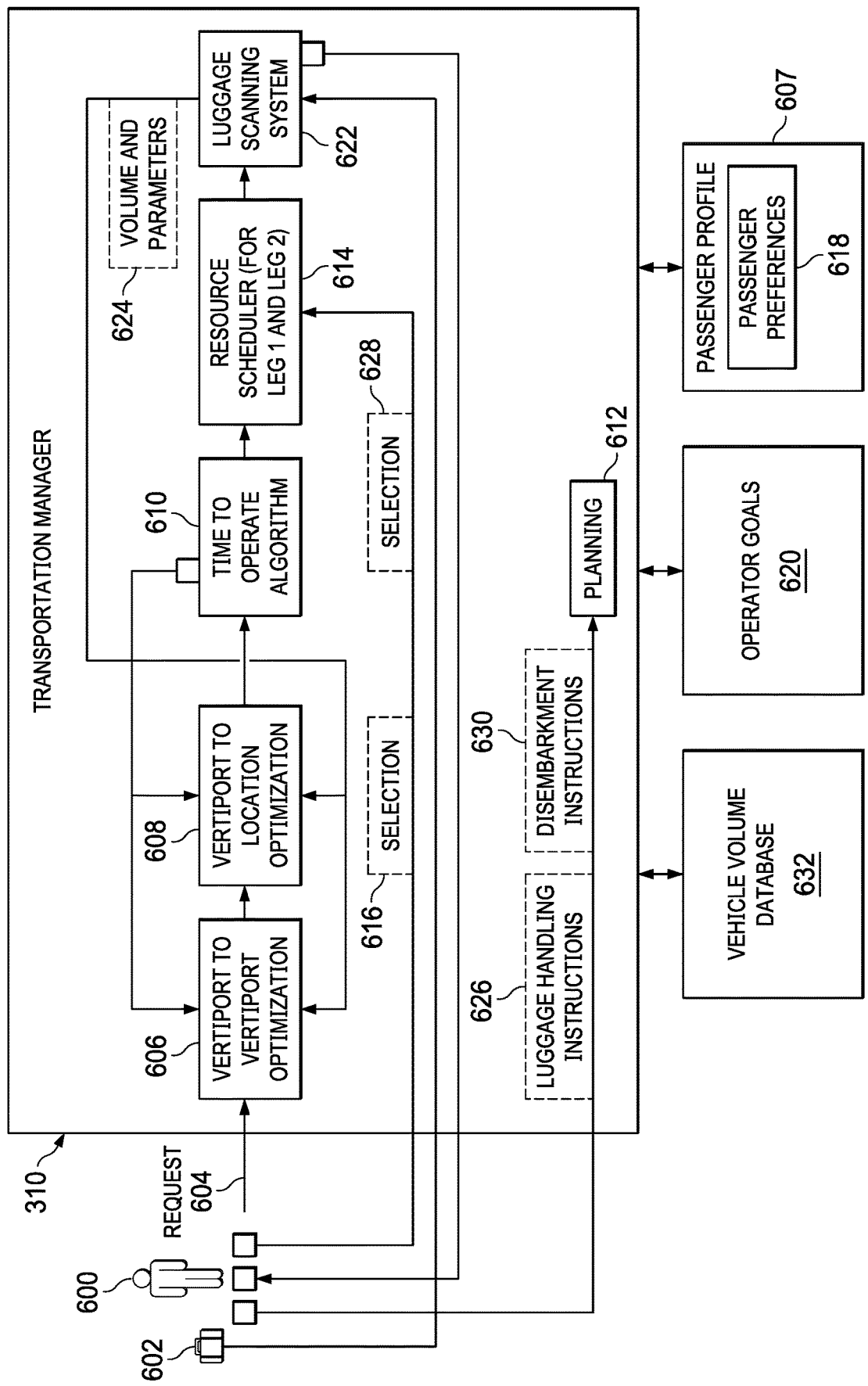
FIG. 6 is an illustration of a block diagram showing dataflow for planning transportation for a passenger in accordance with an illustrative embodiment.

With reference next to FIG. 6, an illustration of a block diagram showing dataflow for planning transportation for a passenger is depicted in accordance with an illustrative embodiment. In this illustrative example, transportation manager 310 can perform a number of different operations in planning travel for passenger 600. As depicted, passenger 600 has luggage 602, which is taken into account by transportation manager 310 in planning travel for passenger 600.

In this illustrative example, passenger 600 makes request 604 to travel from a first location to an second location. In response to receiving request 604, planning 612 in transportation manager 310 can use vertiport-to-vertiport selection 606 to identify potential departure vertiports and potential destination vertiports that can be used for air travel in a potential second leg for candidate routes.

This selection can be made in a manner that improves various customization parameters such as a set of customization parameters 326 in FIG. 3. As used herein, the improvement of a parameter means that the parameter can be improved upon with respect to a goal. This improvement is not required to be the best value with respect to the goal. In this illustrative example, the set of customization parameters are parameters that are to be improved upon. As a result, the set of customization parameters may change from passenger-to-passenger, operator-to-operator, or even flight-to-flight for the same passenger.

In this illustrative example, the particular customization parameters selected for improvement can be made based on a set of passenger preferences 618 in passenger profile 607 for passenger 600 or a set of operator goals 620.

For example, the set of passenger preferences 618 can include a selection of a vertiport amenity, a desired price, and transportation of luggage 602. The set of operator goals 620 can include, for example, reducing passenger air vehicle operating cost and increasing passenger revenue. This improvement can be made using the set of passenger preferences 618 and the set of operator goals 620 can result in the set of potential legs for a set of candidate routes.

In this illustrative example, planning 612 can calculate the possible flights between potential departure vertiports and potential destination vertiports to determine potential second legs for the candidate routes. In this illustrative example, planning 612 in transportation manager 310 can select potential vertiports based on information that is provided in request 604. This information can include a start location, an end location, passenger preferences, desired improvement for particular customization parameters, a selected optimization algorithm, and other suitable information. For example, vertiport-to-vertiport selection 606 can also take into account the projected passenger air vehicle availability given a requested start location, an end location, vertiport preferences, a luggage count, and a passenger count. For example, the luggage count and the passenger count can eliminate flights that cannot support these requests.

Additionally, the identification of the set of passenger preferences 618 can be stored in a passenger profile database, previous selections, or some combination thereof. For example, a passenger may set a preference for vertiport size or the preference may be inferred from the tendency of a passenger to select large vertiports rather than smaller vertiports when traveling on the weekend.

Accounting for passenger preferences enables vertiport-to-vertiport selection 606 to find more accurate and acceptable trip solutions without overwhelming passenger 600 with too many options.

As depicted, planning 612 uses vertiport-to-location selection 608 to identify potential ground legs for the candidate routes.

As depicted, vertiport-to-location selection 608 can be used to identify potential legs from a start location to a departure vertiport and from a destination vertiport to an end location. In this illustrative example, these potential legs use ground transportation as the mode of travel. In this illustrative example, the process can be initiated using request 604.

In one illustrative example, planning 612 in transportation manager 310 can use vertiport-to-location selection 608 to calculate possible trips for potential legs between a start location and respected potential vertiports. In another illustrative example, more than one start location may be provided by passenger 600 in request 604. In this case, transportation manager 310 can use vertiport-to-location selection 608 to calculate possible trips for potential legs between potential start locations and potential vertiports. As depicted in this example, the potential vertiports can be departure vertiports identified by vertiport-to-vertiport selection 606.

In this illustrative example, temporal, financial, and physical parameters are customized parameters that can be based on transit models of each possible ground travel modality. The different ground travel modalities can include, for example, walking, public transportation, biking, an electric scooter, a taxi, a ridesharing vehicle, or other suitable type of ground travel. In these illustrative examples, these customization parameters can be improved to meet cost goals. Cost goals can be for example, reducing particular costs such as fuel usage, a reduction in cost, or some other suitable goal.

Furthermore, planning 612 can use vertiport-to-vertiport selection 606 to identify solutions that are feasible given passenger preferences 618. These passenger preferences can be identified in at least one of request 604, a passenger database, or some other source. In this example, passenger preferences 618 can be, for example, eliminate departure vertiports without bike racks from consideration if biking is selected as an option for the first leg; or not showing a taxi or a ridesharing vehicle as a mode of travel when a taxi or ridesharing vehicle that can support the number of passengers or luggage for the number of passengers is unavailable.

In this illustrative example, planning 612 in transportation manager 310 can also use time to operate algorithm 610 to calculate estimated times to conduct various operations along the route for the potential first legs and the potential second legs identified by vertiport-to-vertiport selection 606 and vertiport-to-location selection 608.

These results can be used by time to operate algorithm 610 to determine the temporal compatibility of any combination of two or three potential legs that are geographically aligned for identifying candidate routes. In other words, time to operate algorithm 610 can be used as feedback to vertiport-to-vertiport selection 606 to eliminate a potential flight that satisfies the second leg because insufficient time is present to clear security with the luggage encumbrance factor for luggage 602 for passenger 600.

In this illustrative example, the operational times considered by time to operate algorithm 610 can include the time to clear security. This time can be a function of at least one of luggage, passengers, or crowds at a vertiport. Another operational time can be time to reach a gate. This operational time can be a function of at least one of luggage, people, or vertiport layout. Time to perform final preflight checks is an example of another operational time that can be take into account. This operational time can include weight confirmation, amount of time needed to load luggage, and other factors. Boarding time can also be considered. This type of operational time can be a function of at least one of passengers or luggage for a flight.

In this illustrative example, time to operate algorithm 610 can use models that have been derived from the aggregation of all operations and vertiport operations data for passengers who have previously traveled using different potential legs. Furthermore, these models can be a function of passenger properties such as luggage quantity, passenger party size, time of day, day of week, vertiport size, vertiport layout, weather, ground traffic, and air traffic. In this illustrative example, time to operate algorithm 610 can be independent in a machine learning model that continues to improve the data models based on the transit experience for passenger's individual passenger behavior. For example, time to operate algorithm 610 can take into account previous trips on routes taken by passenger 600 in determining the amount of time needed for performing certain operations. Time to operate algorithm 610 can take into account the time previously needed by passenger 600 to clear security, travel through a particular vertiport to reach a gate, or other actions that take time or, in this manner, time to operate algorithm 610 can determine whether passenger 600 is, for example, slower or faster paced than average passengers for use in determining the amount of time for particular legs of travel in determining temporal compatibility between the different legs that can be used to create candidate routes for passenger 600.

In this manner, the feedback from time to operate algorithm 610 to vertiport-to-vertiport selection 606 and vertiport-to-location selection 608 can be used to eliminate or consider additional potential legs depending on the temporal compatibility identified by time to operate algorithm 610.

In this illustrative example, transportation manager 310 can use planning 612 to determine candidate routes from the different potential legs identified by the different optimization algorithms. In this illustrative example, planning 612 can calculate the scores for each candidate route. Planning 612 can also identify scores for customization parameters, such as temporal, physical, and financial parameters with respect to goals involving costs.

With these scores, planning 612 can identify candidate routes and present the results to passenger 600 for review and selection. These results can be displayed to passenger 600 on a device such as a mobile phone, smart glasses, a laptop, or other suitable device operated by passenger 600. Passenger 600 can filter the results based on what combination of costs is of interest to passenger 600. In other words, the costs such as travel time and price are costs that can be used by passenger 600 to filter the candidate routes.

In this particular example, resource scheduler 614 can be used by planning 612 to assign resources to the first leg and the second leg of a candidate route when selection 616 is received from passenger 600 selecting the candidate route. The third leg from the destination vertiport to the end location also can optionally be assigned at the same time as the first leg and the second leg in some illustrative examples.

In this illustrative example, transportation manager 310 also can include luggage scanning system 622. As depicted, luggage scanning system 622 is a hardware system and can also include software. Luggage scanning system 622 can include at least one of a camera, a laser scanner, a grid projector, or other suitable devices.

When passenger 600 has luggage 602, luggage scanning system 622 can scan luggage 602 and determine volume and parameters 624 for luggage 602. Volume and parameters 624 include a volume of luggage 602 as well as parameters such as dimensions for each piece of luggage 602 that is present. Parameters can also indicate a type of luggage and whether the luggage is compressible.

In this illustrative example, luggage scanning system 622 can send volume and parameters 624 to vertiport-to-vertiport selection 606 and vertiport-to-location selection 608 for use in selecting the first and second legs. For example, vehicles for ground transportation in the first leg and air transportation in the second leg can be selected based on volume available in a vehicle for storing luggage 602.

In this illustrative example, the volume in a vehicle can be identified from vehicle volume database 632. Vehicle volume database 632 can include volumes, dimensions of different spaces in a vehicle, and other information about the capacity of the vehicle to carry luggage 602. For example, vehicle volume database 632 can include identification of spaces such as a baggage compartment, under-seat storage, a storage bin, and other locations where luggage 602 can be potentially placed. This identification includes dimensions as well identification of the volume available for storing luggage 602. Further, these optimization algorithms can take into account luggage from other passengers when additional passengers are present in addition to passenger 306 in at least one of the first leg or the second leg.

If a desired solution for holding luggage 602 cannot be found, passenger 600 can be informed of suggested solutions. The solutions can include reducing the amount of luggage 602, requesting a larger passenger air vehicle, accepting a risk for a delay, or other solutions.

In this illustrative example, luggage handling instructions 626 can be generated by luggage scanning system 622 and sent to passenger 600. Luggage handling instructions 626 provide passenger 600 with instructions on how to load or pack luggage 602 into each vehicle used for travel on the selected route.

While passenger 600 is enroute on the second leg, transportation manager 310 can use vertiport-to-location selection 608 to identify potential third legs for travel by passenger 600 to reach the end location. The potential third legs for the route are from the destination vertiport to the end location.

Determining the third leg during travel can be performed to provide a more accurate estimate based on the enroute travel time that has occurred. The potential third legs can be generated using passenger preferences 618 and customization parameters.

This process can also be performed during the first leg. However, using vertiport-to-location selection 608 to identify the potential third legs during travel on the second leg can provide for increased accuracy in providing desired travel for passenger 600.

In this illustrative example, vertiport-to-location selection 608 can identify potential third legs based on the parameters of the flight of the passenger air vehicle. For example, if the ground transportation is the third leg of the taxi, an assignment can be made such that the taxi is expected to be at the destination vertiport when the passenger air vehicle has arrived at the destination vertiport and passenger 600 has disembarked.

In this depicted example, the disembark time can be calculated as a function of the number of passengers, luggage, and estimated average time to walk through the destination vertiport. In this illustrative example, vertiport-to-location selection 608 can take into account any delays or gains in travel during the second leg to ensure an accurate estimate of when the taxi needs to be at the destination vertiport.

In this illustrative example, the identified potential third legs for travel can be presented to passenger 600. Passenger 600 can send selection 628 which causes resource scheduling 614 to assign or schedule the resources for the potential legs selected by passenger 600. In making the selection for the potential leg, passenger 600 can select the type of transportation and also may select additional services.

Additionally, when passenger 600 selects the third leg in selection 628, planning 612 in transportation manager 310 can generate disembarkment instructions 630 for passenger 600. For example, planning 612 can generate and send disembarkment instructions 630 to passenger 600.

These instructions can include, for example, the walking directions from the expected gate and the location of the pickup for the transportation for the third leg. Disembarkment instructions 630 can also include information such as a map with locations of restrooms and food places along the route from the gate to the transportation for passenger 600.

In other illustrative examples, potential third legs can also be determined by planning 612 using vertiport-to-location selection 608 at the same time as the potential second legs are determined. In this manner, transportation is already assigned to the third leg. The determination of the potential third legs can still be when passenger 600 is traveling in the passenger air vehicle on the second leg. If a new third leg is presented and selected, planning 612 can make changes to the scheduling of resources to assign the resources needed for the new third leg and to release resources for the previously selected third leg.

The illustrations of multimodal transportation environment 300 and the different components depicted in FIGS. 3-6 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although shown as a single block, transportation manager 310 can be a distributed component that is located in multiple data processing systems within computer system 312 in FIG. 3. Further, user 356 in FIG. 3 can take other forms other than passenger 306. For example, user 356 can be a travel agent setting up travel for passenger 306. As another example, user 356 can be an operator at a company or other organization that arranges shipping of cargo between different locations.

In another illustrative example, the selection performed by vertiport-to-vertiport selection 606 and vertiport-to-location selection 608 can be implemented as a single selection process rather than as separate components. These selections can also be implemented in machine learning models although not shown in FIG. 6.

In yet another illustrative example, other types of aircraft in addition to or in place of a passenger aircraft can be used. For example, the aircraft can be one of a passenger air vehicle, a cargo aircraft, a commercial jet aircraft, a commercial passenger aircraft, an unmanned aerial vehicle, a rotorcraft, a vertical takeoff and landing aircraft, a spacecraft capable of airflight, or other suitable types of aircraft. When aircraft are used that are not takeoff and landing aircraft, an airport facility such as an airport with runways can be used in place of or in addition to a vertiport.

Figure 7:
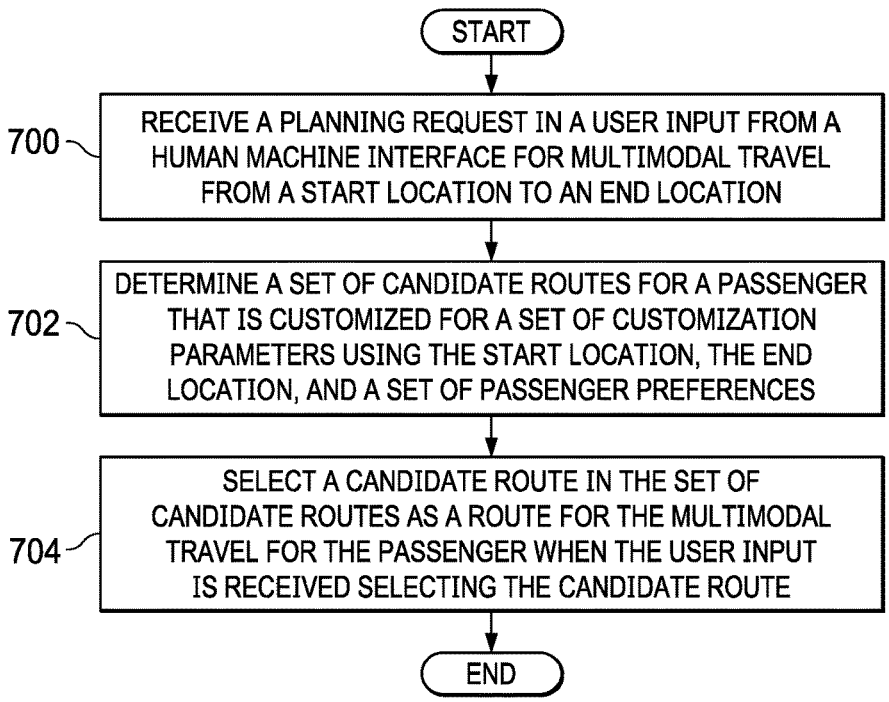
FIG. 7 is an illustration of a flowchart of a process for planning multimodal travel in accordance with an illustrative embodiment.

Turning next to FIG. 7, an illustration of a flowchart of a process for planning multimodal travel is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in transportation manager 230 in network data processing system 200 in FIG. 2 and transportation manager 310 in computer system 312 in FIG. 3.

The process begins by receiving a planning request in a user input from a human machine interface for multimodal travel from a start location to an end location (operation 700). The process determines a set of candidate routes for a passenger that is customized for a set of customization parameters using the start location, the end location, and a set of passenger preferences (operation 702). In operation 702, a candidate route in the set of candidate routes comprises a first leg from the start location to a departure vertiport via a first modality, a second leg for a passenger air vehicle to travel from the departure vertiport to a destination vertiport using an air modality, and a third leg from the destination vertiport to the end location using a second modality.

The process selects a candidate route in the set of candidate routes as a route for the multimodal travel for the passenger when the user input is received selecting the candidate route (operation 704). The process terminates thereafter.

The multimodal travel can occur using the candidate route. For example, this candidate route can be presented to the user and then used for actual travel if accepted.

Figure 8:
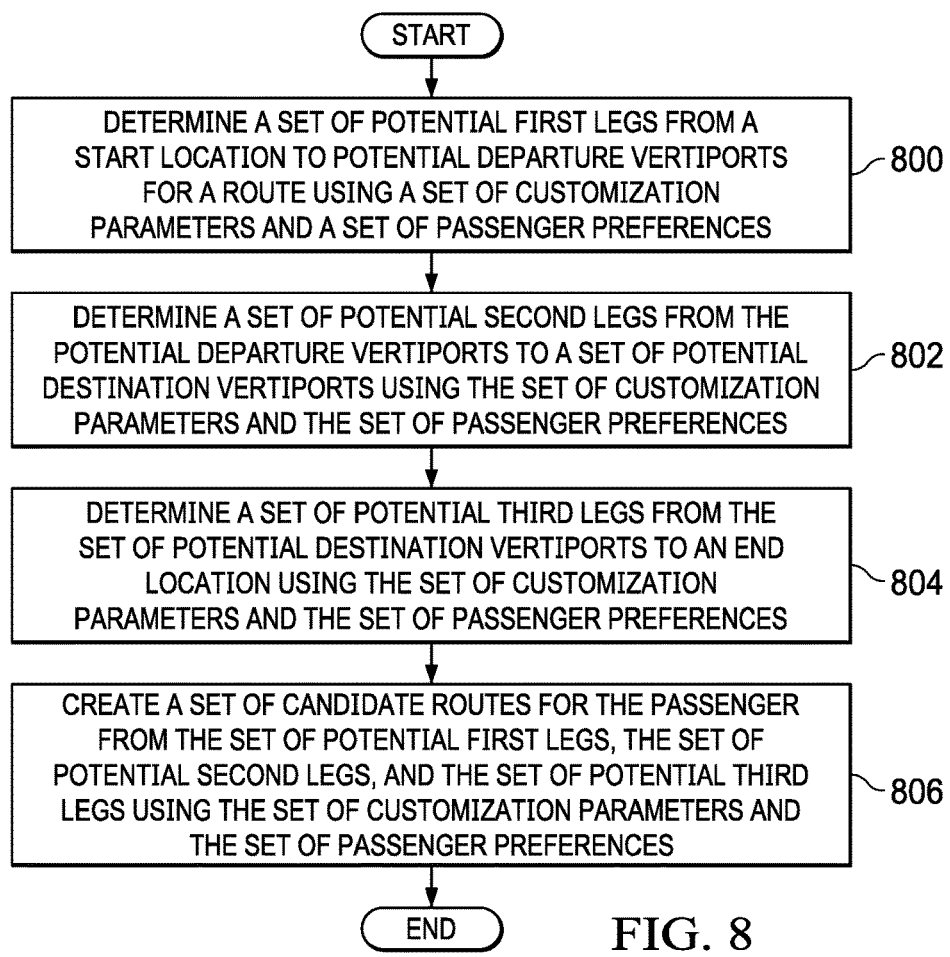
FIG. 8 is an illustration of a flowchart of a process for determining a set of candidate routes in accordance with an illustrative embodiment.

In FIG. 8, an illustration of a flowchart of a process for determining a set of candidate routes is depicted in accordance with an illustrative embodiment. The process illustrated in this figure is an example of one implementation for operation 702 in FIG. 7.

The process begins by determining a set of potential first legs from a start location to potential departure vertiports for a route using a set of customization parameters and a set of passenger preferences (operation 800). The process determines a set of potential second legs from the potential departure vertiports to a set of potential destination vertiports using the set of customization parameters and the set of passenger preferences (operation 802). The process determines a set of potential third legs from the set of potential destination vertiports to an end location using the set of customization parameters and the set of passenger preferences (operation 804).

The process creates a set of candidate routes for the passenger from the set of potential first legs, the set of potential second legs, and the set of potential third legs using the set of customization parameters and the set of passenger preferences (operation 806). In operation 806, the set of candidate routes is customized for the set of customization parameters.

Figure 9:
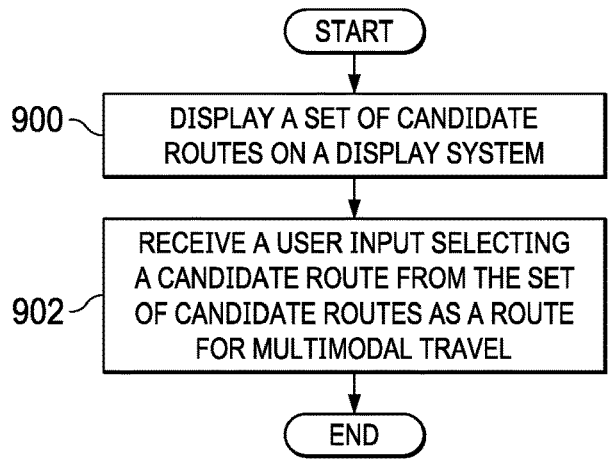
FIG. 9 is an illustration of a flowchart of a process for selecting a candidate route in accordance with an illustrative embodiment.

Turning next to FIG. 9, an illustration of a flowchart of a process for selecting a candidate route is depicted in accordance with an illustrative embodiment. The process illustrated in FIG. 9 is an example of one manner in which operation 704 in FIG. 4 can be implemented.

The process begins by displaying a set of candidate routes on a display system (operation 900). The process receives a user input selecting a candidate route from the set of candidate routes as a route for multimodal travel (operation 902). The process terminates thereafter.

In other implementations, user input may not be needed to select a candidate route. For example, a scheduling process can select the candidate route and provide a notification to the user.

After selection of the candidate routes by the user input, the selected route can then be used for the multimodal travel in which one leg of the multimodal travel is via a passenger air vehicle. The multimodal travel can be performed to move at least one of a passenger or cargo using different modes of transportation in which one mode involves a passenger air vehicle.

Figure 10:
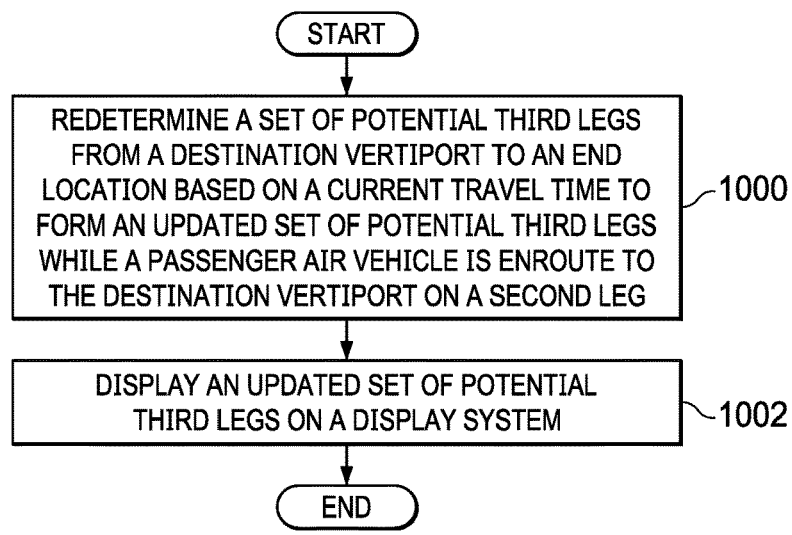
FIG. 10 is an illustration of a flowchart of a process for redetermining legs for an aircraft in accordance with an illustrative embodiment.

In FIG. 10, an illustration of a flowchart of a process for redetermining legs for an aircraft is depicted in accordance with an illustrative embodiment. The process illustrated in this figure is an example of additional operations that can be performed with the operations in the flowchart in FIG. 7.

The process begins by redetermining a set of potential third legs from a destination vertiport to an end location based on a current travel time to form an updated set of potential third legs while a passenger air vehicle is enroute to the destination vertiport on a second leg (operation 1000). The redetermination in operation 1000 can be performed even though a third leg is present and the personal air vehicle is currently traveling on the second leg of the route. This redetermination can be performed during flight or other times during travel such that changes in factors such as a change in estimated arrival time at the destination vertiport, changes in the availability of transportation for the third leg, or other factors or activities can be taken into account during the flight.

In other words, the flight may occur differently than predicted such that the flight arrives earlier than the original prediction. With this change in arrival time, the third leg may be changed in a manner that improves the particular customization parameter. For example, an early arrival may result in an ability to obtain ground transportation at a lower cost as compared to the original estimated arrival time. These and other parameters may be improved at a later time.

The process displays an updated set of potential third legs on a display system (operation 1002). The process terminates thereafter.

Figure 11:
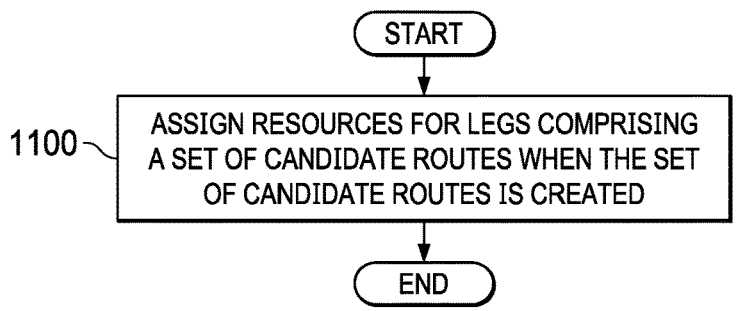
FIG. 11 is an illustration of a flowchart of a process for assigning resources in accordance with an illustrative embodiment.

With reference to FIG. 11, an illustration of a flowchart of a process for assigning resources is depicted in accordance with an illustrative embodiment. The process illustrated in this figure is an example of an additional operation that can be performed with the operations in the flowchart in FIG. 7 and FIG. 10.

The process assigns resources for legs comprising a set of candidate routes when the set of candidate routes is created (operation 1100). The process terminates thereafter.

Figure 12:
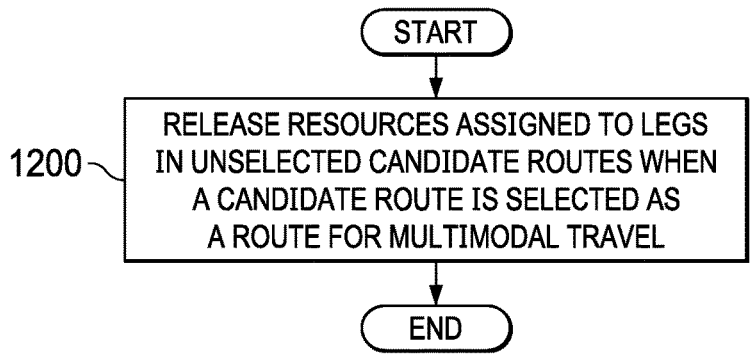
FIG. 12 is an illustration of a flowchart of a process for releasing resources in accordance with an illustrative embodiment.

Turning next to FIG. 12, an illustration of a flowchart of a process for releasing resources is depicted in accordance with an illustrative embodiment. The process illustrated in this figure is an example of an additional operation that can be performed with the operations in the flowchart in FIG. 7, FIG. 10, and FIG. 11.

The process releases resources assigned to legs in unselected candidate routes when a candidate route is selected as a route for multimodal travel (operation 1200). The process terminates thereafter.

Figure 13:
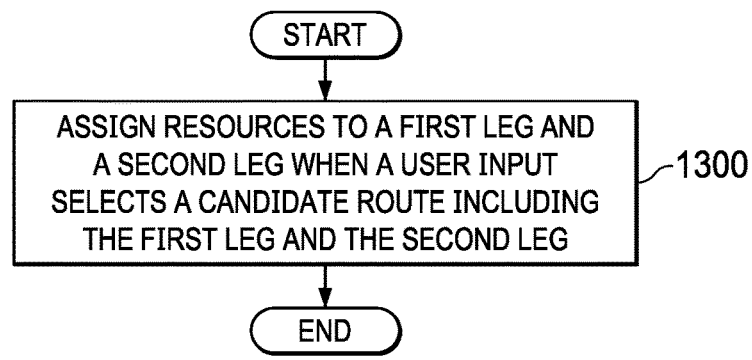
FIG. 13 is an illustration of a flowchart of a process for assigning resources in accordance with an illustrative embodiment.

In FIG. 13, an illustration of a flowchart of a process for assigning resources is depicted in accordance with an illustrative embodiment. The process illustrated in this figure is an example of an operation that can be performed in addition to the operation in FIG. 7.

The process assigns resources to a first leg and a second leg when a user input selects a candidate route including the first leg and the second leg. (operation 1300). The process terminates thereafter.

Figure 14:
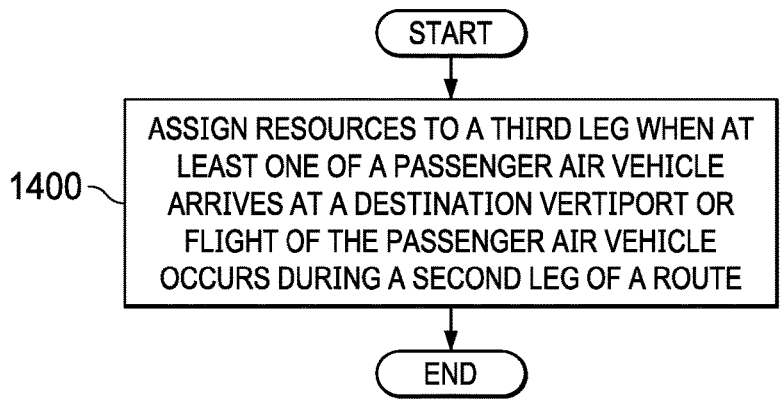
FIG. 14 is an illustration of a flowchart of a process for assigning resources in accordance with an illustrative embodiment.

In FIG. 14, an illustration of a flowchart of a process for assigning resources is depicted in accordance with an illustrative embodiment. The process illustrated in this figure is an example of an operation that can be performed in addition to the operation in FIG. 7.

The process assigns resources to a third leg when at least one of a passenger air vehicle arrives at a destination vertiport or flight of the passenger air vehicle occurs during a second leg of a route (operation 1400). The process terminates thereafter.

Figure 15:
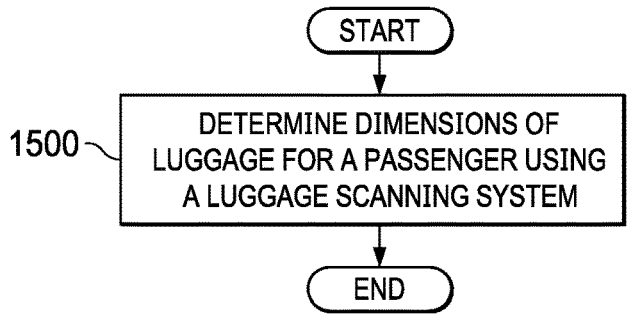
FIG. 15 is an illustration of a flowchart of a process for determining luggage dimensions in accordance with an illustrative embodiment.

In FIG. 15, an illustration of a flowchart of a process for determining luggage dimensions is depicted in accordance with an illustrative embodiment. The process illustrated in this figure is an example of an operation that can be performed in addition to the operation in FIG. 7.

The process begins by determining dimensions of luggage for a passenger using a luggage scanning system (operation 1500). The process terminates thereafter. With the determination of the dimensions, the luggage can be taken into account in determining the candidate routes. For example, the candidate routes can be selected in which the transportation for those routes can carry the luggage for the passenger.

Figure 16:
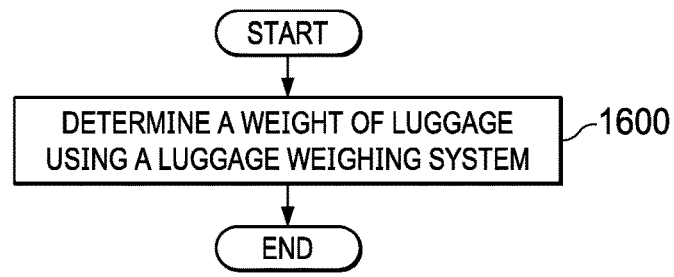
FIG. 16 is an illustration of a flowchart of a process for determining luggage weight in accordance with an illustrative embodiment.

With reference next to FIG. 16, an illustration of a flowchart of a process for determining luggage weight is depicted in accordance with an illustrative embodiment. The process illustrated in this figure is an example of an operation that can be performed in addition to the operation in FIG. 7.

The process begins by determining a weight of luggage using a luggage weighing system (operation 1600). The process terminates thereafter. With this additional operation, the weight of the luggage can be used in determining candidate routes. For example, candidate routes using passenger air vehicles or other aircraft that are capable of carrying the luggage can be selected.

Figure 17:
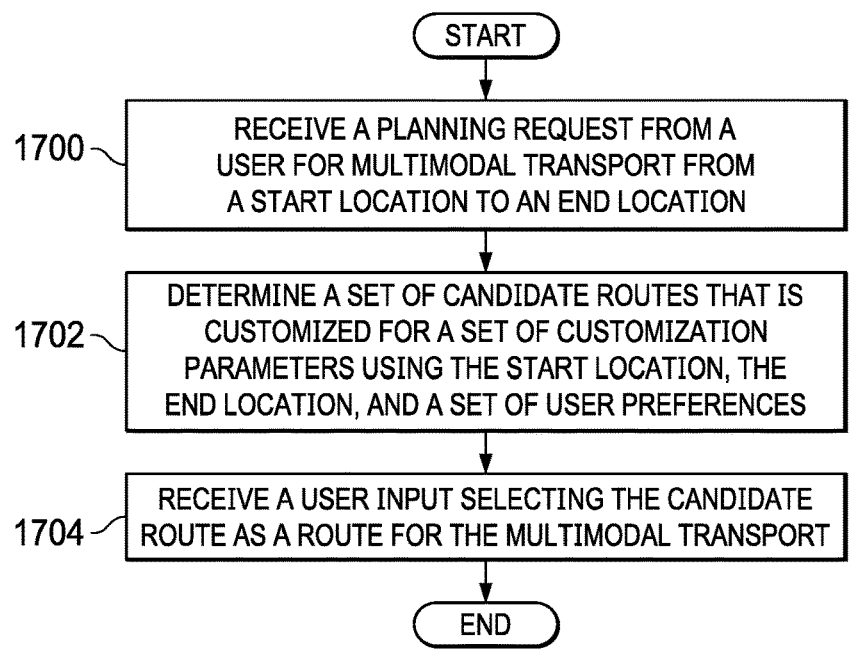
FIG. 17 is an illustration of a flowchart of a process for planning multimodal travel in accordance with an illustrative embodiment.

Turning next to FIG. 17, an illustration of a flowchart of a process for planning multimodal travel is depicted in accordance with an illustrative embodiment. The process in FIG. 17 can be implemented in hardware, software, or both. When implemented in software, the process can take the form of program code that is run by one or more processor units located in one or more hardware devices in one or more computer systems. For example, the process can be implemented in transportation manager 230 in network data processing system 200 in FIG. 2 and transportation manager 310 in computer system 312 in FIG. 3.

The process begins by receiving a planning request from a user for multimodal transport from a start location to an end location (operation 1700). In this illustrative example, the planning request can be a request to transport at least one of a passenger or cargo. The user can be a human operator such as a passenger, a billing clerk, or some other suitable user.

The process determines a set of candidate routes that is customized for a set of customization parameters using the start location, the end location, and a set of user preferences (operation 1702). In operation 1702, a candidate route in the set of candidate routes comprises a first leg from the start location to a departure vertiport via a first modality, a second leg for a passenger air vehicle to travel from the departure vertiport to a destination vertiport using an air modality, and a third leg from the destination vertiport to the end location using a second modality.

The process receives a user input selecting the candidate route as a route for the multimodal transport (operation 1704). The process terminates thereafter. With the selection of the candidate route, at least one of a passenger or cargo can be transported from the start location to the end location in which multiple modes of transportation are present.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 18:
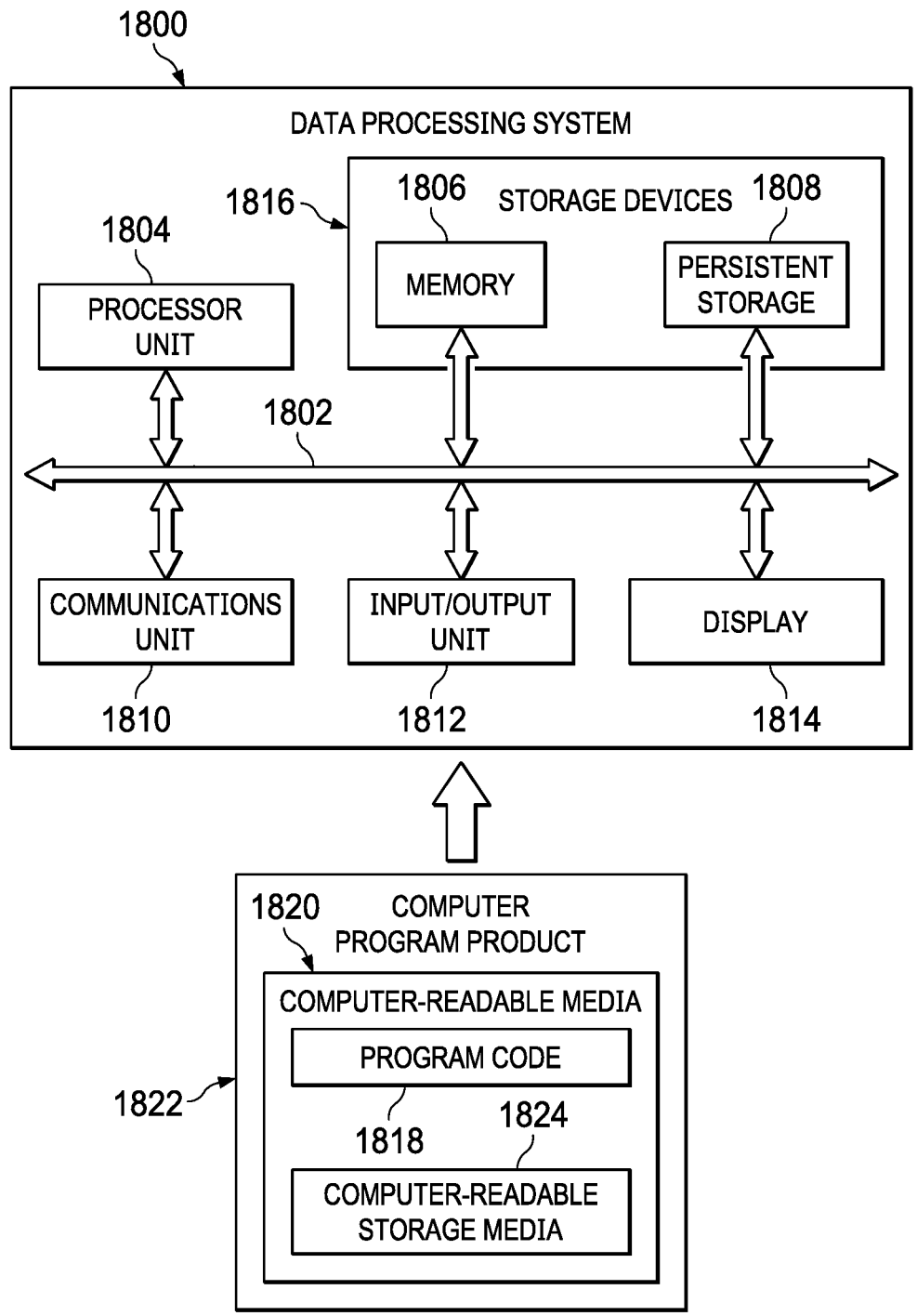
FIG. 18 is an illustration of a block diagram of a data processing system in accordance with an illustrative embodiment.

Turning now to FIG. 18, an illustration of a block diagram of a data processing system is depicted in accordance with an illustrative embodiment. Data processing system 1800 can be used to implement server computer 204, server computer 206, and client devices 210 in FIG. 2. Data processing system 1800 can also be used to implement computer system 312 in FIG. 3. Data processing system 1800 can also be used to implement computers, computing devices, and other data processing systems in air vehicle management environment 100 in FIG. 1.

In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 takes the form of a bus system.

Processor unit 1804 serves to execute instructions for software that can be loaded into memory 1806. Processor unit 1804 includes one or more processors. For example, processor unit 1804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1804 can may be implemented using one or more heterogeneous processor systems in which a main processor is present with secondary processors on a single chip. As another illustrative example, processor unit 1804 can be a symmetric multi-processor system containing multiple processors of the same type on a single chip.

Memory 1806 and persistent storage 1808 are examples of storage devices 1816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1816 may also be referred to as computer-readable storage devices in these illustrative examples. Memory 1806, in these examples, can be, for example, a random-access memory or any other suitable volatile or non-volatile storage device. Persistent storage 1808 can take various forms, depending on the particular implementation.

For example, persistent storage 1808 may contain one or more components or devices. For example, persistent storage 1808 can be a hard drive, a solid-state drive (SSD), a flash memory, a rewritable optical disk, a rewritable magnetic tape, or some combination of the above. The media used by persistent storage 1808 also can be removable. For example, a removable hard drive can be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that can be connected to data processing system 1800. For example, input/output unit 1812 can provide a connection for user input through at least one of a keyboard, a mouse, or some other suitable input device. Further, input/output unit 1812 can send output to a printer. Display 1814 provides a mechanism to display information to a user.

Instructions for at least one of the operating system, applications, or programs can be located in storage devices 1816, which are in communication with processor unit 1804 through communications framework 1802. The processes of the different embodiments can be performed by processor unit 1804 using computer-implemented instructions, which can be located in a memory, such as memory 1806.

These instructions are referred to as program code, computer usable program code, or computer-readable program code that can be read and executed by a processor in processor unit 1804. The program code in the different embodiments can be embodied on different physical or computer-readable storage media, such as memory 1806 or persistent storage 1808.

Program code 1818 is located in a functional form on computer-readable media 1820 that is selectively removable and can be loaded onto or transferred to data processing system 1800 for execution by processor unit 1804. Program code 1818 and computer-readable media 1820 form computer program product 1822 in these illustrative examples. In the illustrative example, computer-readable media 1820 is computer-readable storage media 1824.

In these illustrative examples, computer-readable storage media 1824 is a physical or tangible storage device used to store program code 1818 rather than a media that propagates or transmits program code 1818. Computer-readable storage media 1824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1818 can be transferred to data processing system 1800 using a computer-readable signal media. The computer-readable signal media are signals and can be, for example, a propagated data signal containing program code 1818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1820" can be singular or plural. For example, program code 1818 can be located in computer-readable media 1820 in the form of a single storage device or system. In another example, program code 1818 can be located in computer-readable media 1820 that is distributed in multiple data processing systems. In other words, some instructions in program code 1818 can be located in one data processing system while other instructions in program code 1818 can be located in one data processing system. For example, a portion of program code 1818 can be located in computer-readable media 1820 in a server computer while another portion of program code 1818 can be located in computer-readable media 1820 located in a set of client computers.

The different components illustrated for data processing system 1800 are not meant to provide architectural limitations to the manner in which different embodiments can be implemented. In some illustrative examples, one or more of the components may be incorporated in or otherwise form a portion of, another component. For example, memory 1806, or portions thereof, can be incorporated in processor unit 1804 in some illustrative examples. The different illustrative embodiments can be implemented in a data processing system including components in addition to or in place of those illustrated for data processing system 1800. Other components shown in FIG. 18 can be varied from the illustrative examples shown. The different embodiments can be implemented using any hardware device or system capable of running program code 1818.

Some features of the illustrative examples are described in the following clauses. These clauses are examples of features not intended to limit other illustrative examples.

Clause 1:

A method for planning multimodal travel, the method comprising:

receiving, by a computer system, a planning request for the multimodal travel from a first location to a second location;

determining, by the computer system, a set of candidate routes for a passenger that is customized for a set of customization parameters using the first location, the second location, wherein a candidate route in the set of candidate routes comprises a first leg from the first location to a first vertiport via a first modality, a second leg for an air vehicle to travel from the first vertiport to a second vertiport using an air modality, and a third leg from the second vertiport to the second location using a second modality; and selecting, by the computer system, the candidate route in the set of candidate routes to form a route for the multimodal travel for the passenger when a user input is received selecting the candidate route.

Clause 2:

The method according to clause 1, wherein selecting, by the computer system, the candidate route in the set of candidate routes for form a route for the multimodal travel for the passenger when the user input is received selecting the candidate route comprises:

displaying, by the computer system, the set of candidate routes on a display system; and receiving, by the computer system, the user input selecting the candidate route from the set of candidate routes to form a route for the multimodal travel.

Clause 3:

The method according to clause 1 or 2, wherein the set of candidate routes is determined using a set of optimization algorithms selected from at least one of a mathematical optimization, a Dijkstra's algorithm, an A* algorithm, a vehicle routing problem (VRP) algorithm, a capacitated vehicle routing problem (CVRP) algorithm, a pickup and delivery vehicle routing problem (PDVRP) algorithm, an open vehicle routing problem (OVRP) algorithm, or a vehicle routing problem with time windows (VRPTW) algorithm.

Clause 4:

The method according to clause 1, 2, or 3, wherein determining, by the computer system, the set of candidate routes for the passenger that is customized for the set of customization parameters using the first location, the second location, and a set of passenger preferences comprises:

determining, by the computer system, a set of potential first legs from the first location to potential first vertiports for the route using the set of customization parameters and the set of passenger preferences;

determining, by the computer system, a set of potential second legs from the potential first vertiports to a set of potential second vertiports using the set of customization parameters the set of passenger preferences;

determining, by the computer system, a set of potential third legs from the set of potential second vertiports to the second location using the set of customization parameters and the set of passenger preferences; and creating, by the computer system, the set of candidate routes for the passenger from the set of potential first legs, the set of potential second legs, and the set of potential third legs using the set of customization parameters and the set of passenger preferences, wherein the set of candidate routes is customized for the set of customization parameters.

Clause 5:

The method according to clause 4 further comprising:

determining, by the computer system, the set of potential third legs from the second vertiport to the second location based on a current travel time to form an updated set of potential third legs while a passenger air vehicle is enroute to the second vertiport on the second leg; and displaying, by the computer system, the updated set of potential third legs on a display system.

Clause 6:

The method according to clause 1, 2, 3, 4, or 5 further comprising:

assigning, by the computer system, a set of resources for legs comprising the set of candidate routes when the set of candidate routes is created.

Clause 7:

The method according to clause 6 further comprising:

releasing, by the computer system, the set of resources assigned to the legs in unselected candidate routes when the candidate route is selected to form a route for the multimodal travel.

Clause 8:

The method according to clause 1, 2, 3, 4, 5, 6, or 7 further comprising:

assigning, by the computer system, a set of resources to the first leg and the second leg when the user input selects the candidate route including the first leg and the second leg.

Clause 9:

The method according to clause 1, 2, 3, 4, 5, 6, 7, or 8 further comprising:

assigning, by the computer system, a set of resources to the third leg when at least one of a passenger air vehicle arrives at the second vertiport or flight of the passenger air vehicle during the second leg of the route.

Clause 10:

The method according to clause 1, 2, 3, 4, 5, 6, 7, 8, or 9 further comprising:

determining, by the computer system, dimensions of luggage for the passenger, wherein determining the set of candidate routes for the passenger that is customized for the set of customization parameters using the first location, the second location, and a set of passenger preferences, wherein the candidate route in the set of candidate routes comprises the first leg from the first location to the first vertiport via the first modality, the second leg for a passenger air vehicle to travel from the first vertiport to the second vertiport using the air modality, and the third leg from the second vertiport to the second location using the second modality comprises:

determining, by the computer system, the set of candidate routes for the passenger that is customized for the set of customization parameters using the first location, the second location, the set of passenger preferences, and the dimensions of the luggage, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality.

Clause 11:

The method according to clause 10 further comprising:

creating, by the computer system, luggage handling instructions using the dimensions of the luggage, wherein the luggage handling instructions instruct the passenger on at least one of an order in which the luggage is to be loaded into the passenger air vehicle and an arrangement of luggage in the passenger air vehicle.

Clause 12:

The method according to clause 1, 2, 3, 4, 5, 6, 7, 8, 9, 10, or 11 further comprising:

determining, by the computer system, a weight of luggage;

wherein determining the set of candidate routes for the passenger that is customized for the set of customization parameters using the first location, the second location, and a set of passenger preferences, wherein the candidate route in the set of candidate routes comprises the first leg from the first location to the first vertiport via the first modality, the second leg for a passenger air vehicle to travel from the first vertiport to the second vertiport using the air modality, and the third leg from the second vertiport to the second location using the second modality comprises:
determining, by the computer system, the set of candidate routes for the passenger that is customized for the set of customization parameters using the first location, the second location, the set of passenger preferences, and the weight of the luggage, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality.

Clause 13:
The method according to clause 1, 2, 3, 4, 5, 6, 7, 8, 9, 10, 11, or 12, wherein the set of passenger preferences is selected from at least one of a departure time, an arrival time, a number of passengers, an amount of luggage, a vertiport amenity, a first leg travel mode, a second leg travel mode, a vertiport size, or a vertiport location.

Clause 14:
The method according to clause 1, 2, 3, 4, 5, 6, 7, 8, 9, 10, 11, 12, or 13, wherein the set of customization parameters is selected from at least one of from at least one of a temporal parameter, a physical parameter, or a financial parameter.

Clause 15:
A method for planning multimodal transport, the method comprising:
receiving, by a computer system, a planning request in a user input from a human machine interface for the multimodal transport from a first location to an second location;
determining, by the computer system, a set of candidate routes that is customized for a set of customization parameters using the first location, the second location, wherein a candidate route in the set of candidate routes comprises a first leg from the first location to a first vertiport via a first modality, a second leg for a passenger air vehicle to travel from the first vertiport to a second vertiport using an air modality, and a third leg from the second vertiport to the second location using a second modality; and
receiving, by the computer system, a user input selecting the candidate route to form a route for the multimodal transport.

Clause 16:
The method according to clause 15 further comprising:
displaying, by the computer system, the set of candidate routes on a display system in a human machine interface; and
receiving, by the computer system, the user input from an input system in the human machine interface selecting the candidate route from the set of candidate routes to form the route for the multimodal transport Clause 17:
The method according to clause 15 or 16, wherein the set of candidate routes is determined using a set of optimization algorithms selected from at least one of a mathematical optimization, a Dijkstra's algorithm, an A* algorithm, a vehicle routing problem (VRP) algorithm, a capacitated vehicle routing problem (CVRP) algorithm, a pickup and delivery vehicle routing problem (PDVRP) algorithm, an open vehicle routing problem (OVRP) algorithm, or a vehicle routing problem with time windows (VRPTW) algorithm.

Clause 18:
The method according to clause 15, 16, or 17, wherein determining, by the computer system, the set of candidate routes that is customized for the set of customization parameters the using the first location, the second location comprises:
determining, by the computer system, a set of potential first legs from the first location to potential first vertiports using the set of customization parameters and a set of user preferences;
determining, by the computer system, a set of potential second legs from the potential first vertiports to a set of potential second vertiports using the set of customization parameters and the set of user preferences;
determining, by the computer system, a set of potential third legs from the set of potential second vertiports to the second location using the set of customization parameters and the set of user preferences; and
creating, by the computer system, the set of candidate routes for the multimodal transport from the set of potential first legs, the set of potential second legs, and the set of potential third legs using the set of customization parameters and the set of user preferences, wherein the set of candidate routes is customized for the set of customization parameters.

Clause 19:
The method according to clause 18 further comprising:
determining, by the computer system, the set of potential third legs from the second vertiport to the second location based on a current travel time to form an updated set of potential third legs while the passenger air vehicle is enroute to the second vertiport on the second leg; and
displaying, by the computer system, the updated set of potential third legs on a display system.

Clause 20:
The method according to clause 15, 16, 17, 18, or 19 further comprising:
assigning, by the computer system, resources to legs comprising the set of candidate routes when the set of candidate routes is created.

Clause 21:
The method according to clause 20 further comprising:
releasing, by the computer system, the resources assigned to the legs in unselected candidate routes when the candidate route is selected by the user input to form a route for the multimodal transport.

Clause 22:
The method according to clause 15, 16, 17, 18, 19, or 20 further comprising:
assigning, by the computer system, resources to the first leg and the second leg when the user input selects the candidate route including the first leg and the second leg.

Clause 23:
The method according to clause 15, 16, 17, 18, 19, 20, 21, or 22 further comprising:
assigning, by the computer system, resources to the third leg when at least one of the passenger air vehicle arrives at the second vertiport or during the second leg of the route using the passenger air vehicle.

Clause 24:

The method according to clause 15, 16, 17, 18, 19, 20, 21, 22, or 23, wherein the multimodal transport is for at least one of a passenger or cargo.

Clause 25:

A multimodal planning system comprising:
a computer system; and
a transportation manager in the computer system, wherein the transportation manager is configured to:
receive a planning request for multimodal travel from a first location to an second location;
determine a set of candidate routes for a passenger that is customized for a set of customization parameters using the first location, the second location, and a set of passenger preferences, wherein a candidate route in the set of candidate routes comprises a first leg from the first location to a first vertiport via a first modality, a second leg for a passenger air vehicle to travel from the first vertiport to a second vertiport using an air modality, and a third leg from the second vertiport to the second location using a second modality; and
select the candidate route in the set of candidate routes to form a route for the multimodal travel for the passenger when a user input is received selecting the candidate route.

Clause 26:

The multimodal planning system according to clause 25, in selecting the candidate route in the set of candidate routes to form a route for the multimodal travel for the passenger when the user input is received selecting the candidate route, the transportation manager is configured to:
display the set of candidate routes on a display system; and
receive the user input selecting the candidate route from the set of candidate routes as the route for the multimodal travel.

Clause 27:

The multimodal planning system according to clause 25 or 26, wherein the set of candidate routes is determined using a set of optimization algorithms selected from at least one of a mathematical optimization, a Dijkstra's algorithm, an A* algorithm, a vehicle routing problem (VRP) algorithm, a capacitated vehicle routing problem (CVRP) algorithm, a pickup and delivery vehicle routing problem (PDVRP) algorithm, an open vehicle routing problem (OVRP) algorithm, or a vehicle routing problem with time windows (VRPTW) algorithm.

Clause 28:

The multimodal planning system according to clause 25 26, or 27, wherein in determining the set of candidate routes, the transportation manager is configured to:
determine a set of potential first legs from the first location to potential first vertiports using the set of customization parameters and the set of passenger preferences;
determine a set of potential second legs from the potential first vertiports to a set of potential second vertiports using the set of customization parameters the set of passenger preferences;
determine a set of potential third legs from the set of potential second vertiports to the second location using the set of customization parameters and the set of passenger preferences; and
create the set of candidate routes for the passenger from the set of potential first legs, the set of potential second legs, and the set of potential third legs using the set of customization parameters and the set of passenger preferences, wherein the set of candidate routes is customized for the set of customization parameters.

Clause 29:

The multimodal planning system according to clause 28, wherein the transportation manager is configured to:
redetermine the set of potential third legs from the second vertiport to the second location based on a current travel time to form an updated set of potential third legs while the passenger air vehicle is enroute to the second vertiport on the second leg; and
display the updated set of potential third legs on a display system.

Clause 30:

The multimodal planning system according to clause 28, wherein the transportation manager is configured to:
assign resources for legs comprising the set of candidate routes when the set of candidate routes is created.

Clause 31:

The multimodal planning system according to clause 30, wherein the transportation manager is configured to:
release the resources assigned for the legs in unselected candidate routes when the candidate route is selected by the user input to form the route for the multimodal travel.

Clause 32:

The multimodal planning system according to clause 25, 26, 27, 28, 29, 30, or 31, wherein the transportation manager is configured to:
assign resources to the first leg and the second leg when the user input selects the candidate route including the first leg and the second leg.

Clause 33:

The multimodal planning system according to clause 25, 26, 27, 28, 29, 30, 31, or 32, wherein the transportation manager is configured to:
assign resources to the third leg when at least one of the passenger air vehicle arrives at the second vertiport or during the second leg of the route using the passenger air vehicle.

Clause 34:

The multimodal planning system according to clause 25, 26, 27, 28, 29, 30, 31, 32, or 33, wherein the transportation manager is configured to:
determine dimensions of luggage for the passenger, wherein in determining the set of candidate routes for the passenger that is customized for the set of customization parameters using the first location, the second location, and the set of passenger preferences, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality, wherein the transportation manager is configured to:
determine the set of candidate routes for the passenger that is customized for the set of customization parameters using the first location, the second location, the set of passenger preferences, and the dimensions of the luggage, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality.

Clause 35:

The multimodal planning system according to clause 34, wherein the transportation manager is configured to:
 create luggage handling instructions using the dimensions of the luggage, wherein the luggage handling instructions instruct the passenger on at least one of an order in which the luggage is to be loaded into the passenger air vehicle and an arrangement of luggage in the passenger air vehicle.

Clause 36:

The multimodal planning system according to clause 25, 26, 27, 28, 29, 30, 31, 32, 33, or 35, wherein the transportation manager is configured to:
 determine a weight of luggage;
 wherein in determining the set of candidate routes for the passenger that is customized for the set of customization parameters using the first location, the second location, and the set of passenger preferences, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality, and wherein the transportation manager is configured to:
 determine the set of candidate routes for the passenger that is customized for the set of customization parameters using the first location, the second location, the set of passenger preferences, and the weight of the luggage, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality.

Clause 37:

The multimodal planning system according to clause 25, 26, 27, 28, 29, 30, 31, 32, 33, 35, or 36, wherein the set of customization parameters is selected from at least one of from at least one of a temporal parameter, a physical parameter, or a financial parameter.

Clause 38:

A multimodal planning system comprising:
 a computer system; and
 a transportation manager in the computer system, wherein the transportation manager is configured to:
 receive a planning request from a user for multimodal transport from a first location to an second location;
 determine a set of candidate routes that is customized for a set of customization parameters using the first location, the second location, and a set of user preferences, wherein a candidate route in the set of candidate routes comprises a first leg from the first location to a first vertiport via a first modality, a second leg for an aircraft to travel from the first vertiport to a second vertiport using an air modality, and a third leg from the second vertiport to the second location using a second modality; and
 receive a user input selecting the candidate route to form a route for the multimodal transport.

Clause 39:

The multimodal planning system according to clause 38, wherein the transportation manager is configured to:
 facilitate a display of the set of candidate routes to the user on a display system; and
 receive the user input from the user selecting the candidate route from the set of candidate routes to form the route for the multimodal transport.

Clause 40:

The multimodal planning system according to clause 39, wherein the set of candidate routes is determined using a set of optimization algorithms selected from at least one of a mathematical optimization, a Dijkstra's algorithm, an A* algorithm, a vehicle routing problem (VRP) algorithm, a capacitated vehicle routing problem (CVRP) algorithm, a pickup and delivery vehicle routing problem (PDVRP) algorithm, an open vehicle routing problem (OVRP) algorithm, or a vehicle routing problem with time windows (VRPTW) algorithm.

Clause 41:

The multimodal planning system according to clause 39 or 40, wherein in determining the set of candidate routes, wherein the transportation manager is configured to:
 determine a set of potential first legs from the first location to potential first vertiports for the route using the set of customization parameters and the set of user preferences;
 determine a set of potential second legs from the potential first vertiports to a set of potential second vertiports using the set of customization parameters the set of user preferences;
 determine a set of potential third legs from the set of potential second vertiports to the second location using the set of customization parameters and the set of user preferences; and
 create the set of candidate routes for the user from the set of potential first legs, the set of potential second legs, and the set of potential third legs using the set of customization parameters and the set of user preferences, wherein the set of candidate routes is customized for the set of customization parameters.

Clause 42:

The multimodal planning system according to clause 41, wherein the transportation manager is configured to:
 determine the set of potential third legs from the second vertiport to the second location based on a current travel time to form an updated set of potential third legs while the aircraft is enroute to the second vertiport on the second leg; and
 display the updated set of potential third legs to the user.

Clause 43:

The multimodal planning system according to clause 39, 40, 41, or 42, wherein the transportation manager is configured to:
 assign resources to legs comprising the set of candidate routes when the set of candidate routes is created.

Clause 44:

The multimodal planning system according to clause 43, wherein the transportation manager is configured to:
 release the resources assigned to the legs in unselected candidate routes when the candidate route is selected by the user input to form the route for the multimodal transport.

Clause 45:

The multimodal planning system according to clause 39, 40, 41, 42, 43, or 44, wherein the transportation manager is configured to:
 assign resources to the first leg and the second leg when the user input selects the candidate route including the first leg and the second leg.

Clause 46:

The multimodal planning system according to clause 39, 40, 41, 42, 43, 44, or 45, wherein the transportation manager is configured to:

assign resources to the third leg when at least one of when the aircraft arrives at the second vertiport or during the second leg of the route using the aircraft.

Clause 47:

The multimodal planning system according to clause 39, 40, 41, 42, 43, 44, 45, or 46, wherein the multimodal transport is for at least one of a passenger or cargo.

Clause 48:

The multimodal planning system of according to clause 39, 40, 41, 42, 43, 44, 45, 46, or 47, wherein the aircraft is selected from one of a passenger air vehicle, a cargo aircraft, a commercial jet aircraft, a commercial passenger aircraft, an unmanned aerial vehicle, a rotorcraft, a vertical takeoff and landing aircraft, and a spacecraft.

Thus, the illustrative examples provide a method, apparatus, system, and computer program product for planning transport using multiple transport goods. For example, the illustrative examples can use an air-based mode of travel with one or more different types of ground-based travel to move at least one of a passenger or cargo from a start location to an end location.

In one illustrative example, a method is used to plan multimodal transport. A planning request is received from a user for the multimodal transport from a start location to an end location. A set of candidate routes that is customized for a set of customization parameters is determined a using the start location, the end location, and a set of user preferences. The candidate route in the set of candidate routes comprises a first leg from the start location to a departure vertiport via a first modality, a second leg for a passenger air vehicle to travel from the departure vertiport to a destination vertiport using an air modality, and a third leg from the destination vertiport to the end location using a second modality. A user input is received selecting the candidate route as a route for the multimodal transport.

With the selection of the user input selecting the candidate route, travel for at least one of a passenger or cargo can be performed using the candidate route. Further, other factors such as luggage for the passenger can be considered in identifying candidate routes.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for planning multimodal travel, the method comprising a computer system:

receiving a planning request for the multimodal travel from a first location to a second location;

determining a set of candidate routes for a passenger that is customized for a set of customization parameters using the first location, the second location, wherein a candidate route in the set of candidate routes comprises a first leg from the first location to a first vertiport via a first modality, a second leg for an air vehicle to travel from the first vertiport to a second vertiport using an air modality, and a third leg from the second vertiport to the second location using a second modality;

assigning and placing on hold a set of resources for legs comprising the set of candidate routes when the set of candidate routes is created;

selecting the candidate route in the set of candidate routes to form a route for the multimodal travel for the passenger when a user input is received selecting the candidate route; and releasing from hold a set of resources for legs in unselected candidate routes when the candidate route is selected to form the route for the multimodal travel.

2. The method of claim 1, wherein selecting, by the computer system, the candidate route in the set of candidate routes to form the route for the multimodal travel for the passenger when the user input is received selecting the candidate route comprises:

displaying, by the computer system, the set of candidate routes on a display system; and receiving, by the computer system, the user input selecting the candidate route from the set of candidate routes to form the route for the multimodal travel.

3. The method of claim 1, wherein the set of candidate routes is determined using a set of optimization algorithms selected from at least one of: a Dijkstra's algorithm, an A* algorithm a capacitated vehicle routing problem (CVRP) algorithm, a pickup and delivery vehicle routing problem (PDVRP) algorithm, an open vehicle routing problem (OVRP) algorithm, or a vehicle routing problem with time windows (VRPTW) algorithm.

4. The method of claim 1, wherein determining, by the computer system, the set of candidate routes for the passenger that is customized for the set of customization parameters using the first location, the second location, and a set of passenger preferences comprises:

determining, by the computer system, a set of potential first legs from the first location to potential first vertiports for the route using the set of customization parameters and the set of passenger preferences;

determining, by the computer system, a set of potential second legs from the potential first vertiports to a set of potential second vertiports using the set of customization parameters the set of passenger preferences;

determining, by the computer system, a set of potential third legs from the set of potential second vertiports to the second location using the set of customization parameters and the set of passenger preferences; and creating, by the computer system, the set of candidate routes for the passenger from the set of potential first legs, the set of potential second legs, and the set of potential third legs using the set of customization parameters and the set of passenger preferences, wherein the set of candidate routes is customized for the set of customization parameters.

5. The method of claim 4, further comprising:
determining, by the computer system, the set of potential third legs from the second vertiport to the second location based on a current travel time to form an updated set of potential third legs while a passenger air vehicle is enroute to the second vertiport on the second leg; and
displaying, by the computer system, the updated set of potential third legs on a display system.

6. The method of claim 1, further comprising:
assigning, by the computer system, a set of resources to the first leg and the second leg when the user input selects the candidate route including the first leg and the second leg.

7. The method of claim 1, further comprising:
assigning, by the computer system, a set of resources to the third leg when at least one of a passenger air vehicle arrives at the second vertiport or flight of the passenger air vehicle during the second leg of the route.

8. The method of claim 1, further comprising:
determining, by the computer system, dimensions of luggage for the passenger,
wherein determining the set of candidate routes for the passenger that is customized for the set of customization parameters using the first location, the second location, and a set of passenger preferences, wherein the candidate route in the set of candidate routes comprises the first leg from the first location to the first vertiport via the first modality, the second leg for a passenger air vehicle to travel from the first vertiport to the second vertiport using the air modality, and the third leg from the second vertiport to the second location using the second modality comprises:
determining, by the computer system, the set of candidate routes for the passenger that is customized for the set of customization parameters using the first location, the second location, the set of passenger preferences, and the dimensions of the luggage, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality.

9. The method of claim 8, further comprising:
creating, by the computer system, luggage handling instructions using the dimensions of the luggage, wherein the luggage handling instructions instruct the passenger on at least one of an order in which the luggage is to be loaded into the passenger air vehicle and an arrangement of the luggage in the passenger air vehicle.

10. The method of claim 1, further comprising:
determining, by the computer system, a weight of luggage;
wherein determining the set of candidate routes for the passenger that is customized for the set of customization parameters using the first location, the second location, and a set of passenger preferences, wherein the candidate route in the set of candidate routes comprises the first leg from the first location to the first vertiport via the first modality, the second leg for a passenger air vehicle to travel from the first vertiport to the second vertiport using the air modality, and the third leg from the second vertiport to the second location using the second modality comprises:
determining, by the computer system, the set of candidate routes for the passenger that is customized for the set of customization parameters using the first location, the second location, the set of passenger preferences, and the weight of the luggage, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality.

11. A method for planning multimodal transport, the method comprising a computer system:
receiving a planning request in a user input from a human machine interface for the multimodal transport from a first location to a second location;
determining a set of candidate routes that is customized for a set of customization parameters using the first location, the second location, wherein a candidate route in the set of candidate routes comprises a first leg from the first location to a first vertiport via a first modality, a second leg for a passenger air vehicle to travel from the first vertiport to a second vertiport using an air modality, and a third leg from the second vertiport to the second location using a second modality;
assigning and placing on hold a set of resources for legs comprising the set of candidate routes when the set of candidate routes is created;
receiving a user input selecting the candidate route to form a route for the multimodal transport; and
releasing from hold a set of resources for legs in unselected candidate routes when the candidate route is selected to form the route for the multimodal travel.

12. The method of claim 11, further comprising:
displaying, by the computer system, the set of candidate routes on a display system in the human machine interface; and
receiving, by the computer system, the user input from an input system in the human machine interface selecting the candidate route from the set of candidate routes to form the route for the multimodal transport.

13. The method of claim 11, further comprising the computer system:
determining a set of potential first legs from the first location to potential first vertiports using the set of customization parameters and a set of user preferences;
determining a set of potential second legs from the potential first vertiports to a set of potential second vertiports using the set of customization parameters and the set of user preferences;
determining a set of potential third legs from the set of potential second vertiports to the second location using the set of customization parameters and the set of user preferences; and
creating the set of candidate routes for the multimodal transport from the set of potential first legs, the set of potential second legs, and the set of potential third legs using the set of customization parameters and the set of user preferences, wherein the set of candidate routes is customized for the set of customization parameters.

14. A multimodal planning system that comprises:
a computer system that comprises a transportation manager configured to:
receive a planning request for multimodal travel from a first location to a second location;
determine a set of candidate routes for a passenger that is customized for a set of customization parameters based upon: the first location, the second location, and a set of passenger preferences, wherein a candidate route in the set of candidate routes comprises a first leg from the first location to a first vertiport via a first modality, a second leg for a passenger air vehicle to travel from the first vertiport to a second vertiport using an air modality, and a third leg from the second vertiport to the second location using a second modality;
assign and place on hold resources for legs comprising the set of candidate routes when the set of candidate routes is created;
select the candidate route in the set of candidate routes to form a route for the multimodal travel for the passenger when a user input is received selecting the candidate route; and
release from hold, responsive to a selection of the candidate route, resources for legs in unselected candidate routes to form the route for the multimodal travel.

15. The multimodal planning system of claim 14, wherein, the transportation manager is further configured to:
display the set of candidate routes on a display system; and
receive the user input selecting the candidate route from the set of candidate routes to form the route for the multimodal travel.

16. The multimodal planning system of claim 14, wherein the set of candidate routes is determined based upon a set of optimization algorithms selected from at least one of: a Dijkstra's algorithm, an A* algorithm, a capacitated vehicle routing problem (CVRP) algorithm, a pickup and delivery vehicle routing problem (PDVRP) algorithm, an open vehicle routing problem (OVRP) algorithm, or a vehicle routing problem with time windows (VRPTW) algorithm.

17. The multimodal planning system of claim 14, wherein the transportation manager is further configured to:
determine a set of potential first legs from the first location to potential first vertiports based upon the set of customization parameters and the set of passenger preferences;
determine a set of potential second legs from the potential first vertiports to a set of potential second vertiports based upon the set of customization parameters the set of passenger preferences;
determine a set of potential third legs from the set of potential second vertiports to the second location based upon the set of customization parameters and the set of passenger preferences; and
create the set of candidate routes for the passenger from the set of potential first legs, the set of potential second legs, and the set of potential third legs based upon the set of customization parameters and the set of passenger preferences, wherein the set of candidate routes is customized for the set of customization parameters.

18. The multimodal planning system of claim 17, wherein the transportation manager is further configured to:
redetermine the set of potential third legs from the second vertiport to the second location based on a current travel time to form an updated set of potential third legs while the passenger air vehicle is enroute to the second vertiport on the second leg; and
display the updated set of potential third legs on a display system.

19. The multimodal planning system of claim 14, wherein the transportation manager is further configured to:
assign resources for the first leg and the second leg when the user input selects the candidate route including the first leg and the second leg.

20. The multimodal planning system of claim 14, wherein the transportation manager is further configured to:
assign resources for the third leg when at least one of the passenger air vehicle arrives at the second vertiport or during the second leg of the route using the passenger air vehicle.

21. The multimodal planning system of claim 14, wherein the transportation manager is further configured to:
determine dimensions of luggage for the passenger, wherein the transportation manager is further configured to
determine the set of candidate routes for the passenger that is customized for the set of customization parameters based upon: the first location, the second location, the set of passenger preferences, and the dimensions of the luggage, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality.

22. The multimodal planning system of claim 14, wherein the transportation manager is further configured to:
determine a weight of luggage wherein the transportation manager is further configured to
determine the set of candidate routes for the passenger that is customized for the set of customization parameters based upon: the first location, the second location, the set of passenger preferences, and the weight of the luggage, wherein the candidate route in the set of candidate routes comprises the first leg from the first location to the first vertiport via the first modality, the second leg for the passenger air vehicle to travel from the first vertiport to the second vertiport using the air modality, and the third leg from the second vertiport to the second location using the second modality.

23. The multimodal planning system of claim 14, wherein the set of customization parameters is selected from at least one of from at least one of a temporal parameter, a physical parameter, or a financial parameter.

24. A multimodal planning system that comprises:
a computer system that comprises a transportation manager configured to:
receive a planning request from a user for multimodal transport from a first location to an second location;
determine a set of candidate routes that is customized for a set of customization parameters based upon: the first location, the second location, and a set of user preferences, wherein a candidate route in the set of candidate routes comprises a first leg from the first location to a first vertiport via a first modality, a second leg for an aircraft to travel from the first vertiport to a second vertiport using an air modality, and a third leg from the second vertiport to the second location using a second modality;

assign and place on hold resources for legs comprising the set of candidate routes when the set of candidate routes is created;

receive a user input that selects the candidate route to form a route for the multimodal transport; and release from hold, responsive to a selection of the candidate route, resources for legs in unselected candidate routes to form the route for the multimodal travel.

25. The multimodal planning system of claim 24, wherein the transportation manager is further configured to:

determine a set of potential first legs from the first location to potential first vertiports for the route based upon the set of customization parameters and the set of user preferences;

determine a set of potential second legs from the potential first vertiports to a set of potential second vertiports based upon the set of customization parameters the set of user preferences;

determine a set of potential third legs from the set of potential second vertiports to the second location based upon the set of customization parameters and the set of user preferences; and create the set of candidate routes for the user from the set of potential first legs, the set of potential second legs, and the set of potential third legs based upon the set of customization parameters and the set of user preferences, wherein the set of candidate routes is customized for the set of customization parameters.

26. The multimodal planning system of claim 25, wherein the transportation manager is further configured to:

determine the set of potential third legs from the second vertiport to the second location based on a current travel time to form an updated set of potential third legs while the aircraft is enroute to the second vertiport on the second leg; and display the updated set of potential third legs to the user.

* * * * *